United States Patent
Yeo et al.

(10) Patent No.: US 8,334,924 B2
(45) Date of Patent: Dec. 18, 2012

(54) EXPOSURE CONTROL FOR AN IMAGING SYSTEM

(75) Inventors: Yunn-En Yeo, Singapore (SG); Hiok-Nam Tay, Singapore (SG)

(73) Assignee: CANDELA Microsystems (S) Pte. Ltd., Singapore (SG)

(*) Notice: Subject to any disclaimer, the term of this patent is extended or adjusted under 35 U.S.C. 154(b) by 0 days.

(21) Appl. No.: 13/464,957

(22) Filed: May 5, 2012

(65) Prior Publication Data
US 2012/0218434 A1    Aug. 30, 2012

Related U.S. Application Data

(62) Division of application No. 12/218,742, filed on Jul. 16, 2008, now Pat. No. 8,264,594.

(60) Provisional application No. 60/962,028, filed on Jul. 25, 2007.

(51) Int. Cl.
  *H04N 5/235* (2006.01)
  *G03B 7/00* (2006.01)

(52) U.S. Cl. .................................. 348/362; 348/222.1

(58) Field of Classification Search ............... 348/222.1, 348/362
See application file for complete search history.

(56) References Cited

U.S. PATENT DOCUMENTS

| | | | |
|---|---|---|---|
| 5,929,908 A * | 7/1999 | Takahashi et al. ............ 348/364 |
| 7,298,402 B2 * | 11/2007 | Horiuchi ..................... 348/229.1 |
| 7,646,411 B2 * | 1/2010 | Igarashi ........................ 348/254 |

* cited by examiner

*Primary Examiner* — Gevell Selby
(74) *Attorney, Agent, or Firm* — Irell & Manella, LLP; Ben Yorks

(57) ABSTRACT

A device that analyzes an image. The device includes a circuit that receives an image that includes a plurality of pixels. The circuit creates a histogram of the image and analyzes the histogram to determine an acceptable exposure of the image. The histogram may include a plurality of bins versus a population of pixels associated with each bin. By way of example, the bins may be associated with an intensity of light. The images and histograms may include data defined by low dynamic range number of bits and/or an extended dynamic range number of bits. Certain features and criteria of the image may be determined and analyzed to determine whether the image has an acceptable exposure. If the image is unacceptable, an exposure characteristic can be changed and the process can be repeated until an acceptable image is obtained.

6 Claims, 47 Drawing Sheets

LDR 1    RED 1

LDR 2    RED 2

LDR 3    RED 3

LDR 4    RED 4

EXPOSURE CONTROL FOR AN IMAGING SYSTEM

REFERENCE TO CROSS-RELATED APPLICATIONS

This application is a division of U.S. patent application Ser. No. 12/218,742, filed on Jul. 16, 2008, which claims priority to Application No. 60/962,028 filed on Jul. 25, 2007.

BACKGROUND OF THE INVENTION

1. Field of the Invention

The subject matter disclosed, generally relates to automatic exposure control in a digital camera.

2. Background Information

Digital cameras contain an image sensor that converts optical energy into electrical signals. Most digital cameras are equipped with automatic exposure control. Exposure control involves determining the exposure settings that best utilize the dynamic range of the image sensor given the characteristics of an image scene being photographed. The dynamic range of an image sensor may be defined as the ratio of the highest signal output to the lowest useful signal output.

Image sensors have a limited dynamic range. A typical electronic image sensor has a dynamic range less than the dynamic range of natural scenes. This is mainly due to multiple light sources with widely varying intensities illuminating the scene objects.

Generally speaking it is desirable to have an exposure so that the captured image is not too bright or too dark. Commonly, this is achieved through moving an image histogram to an optimal point within the bounds of maximum and minimum output signal levels of the system. The histograms are frequency distributions of image pixels based on intensity values.

Exposure control in a camera typically involves measuring the average intensity of light from a sample area of an image scene being photographed. Exposure settings are then selected to scale the average to a pre-determined percentage of the dynamic range of the image sensor. One technique, commonly referred to as mean photometry, includes detecting the entire image region and controlling the exposure so that the detection signal has a constant level. Another method, commonly referred to as center-emphasizing photometry, detects only a central portion of the image region and controls the exposure so the detection signal has a constant level. A combination of mean photometry and center-emphasizing photometry can be accomplished by weighting the detection data of the entire video region and the detection data of the center region, and performing exposure control based upon detection data obtained by adding the weighted data at a fixed ratio. A finer exposure control can be achieved by sub-dividing a scene into areas, detecting video in each area and limiting the areas of detection data used in exposure control or changing the weighting. However, even the photometric methods described above do not always provide a state of exposure control that is suitable for the scene in question.

BRIEF SUMMARY OF THE INVENTION

A device that analyzes an image. The device includes a circuit that receives an image that includes a plurality of pixels. The circuit creates a histogram of the image and analyzes the histogram to determine an acceptable exposure of the image.

DETAILED DESCRIPTION

Disclosed is a device that analyzes an image. The device includes a circuit that receives an image that includes a plurality of pixels. The circuit creates a histogram of the image and analyzes the histogram to determine an acceptable exposure of the image. The histogram may include a plurality of bins versus a population of pixels associated with each bin. By way of example, the bins may be associated with an intensity of light. The images and histograms may include data defined by a low dynamic range number of bits and/or an extended dynamic range number of bits. Certain features and criteria of the image may be determined and analyzed to determine whether the image has an acceptable exposure. If the image is unacceptable, an exposure characteristic can be changed and the process can be repeated until an acceptable image is obtained.

Figure 1:
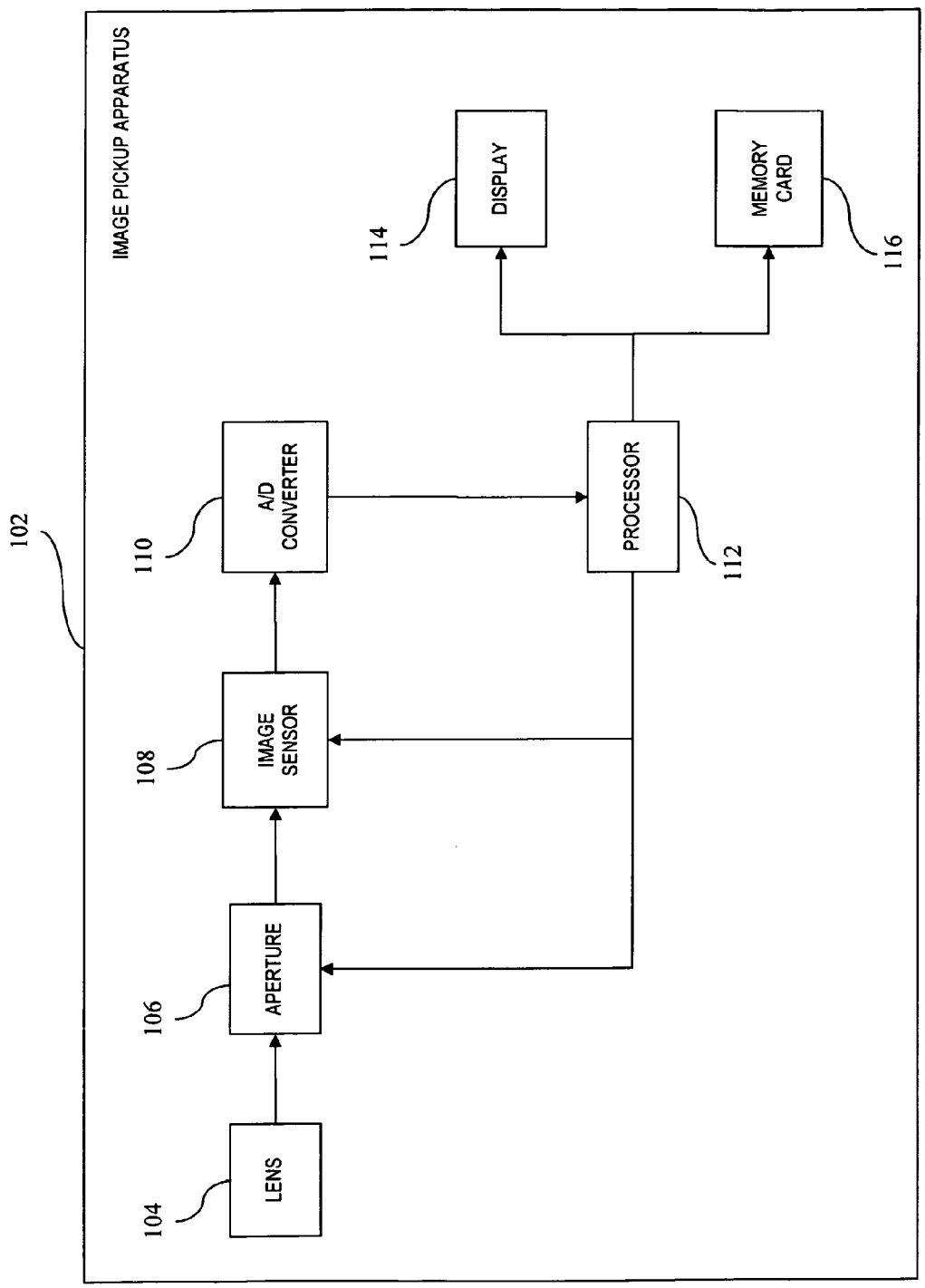
FIG. 1 is an illustration showing a block diagram of an image pickup apparatus.

Referring to the drawings more particularly by reference numbers, FIG. 1 shows an embodiment of an image pickup apparatus 102. The embodiment represents a digital still camera, but there can be many different embodiments that can make use of the imaging system to control exposure of an image. The image pickup apparatus 102 includes a lens 104, an aperture 106, an image sensor 108, an A/D converter 110, a processor 112, a display 114 and a memory card 116. Light from a scene enters through the lens 104, while the aperture 106 controls the amount of light entering into the image sensor 108. The analog signal obtained from the image sensor 108 is converted to a digital signal by the A/D converter 110. The digital signal is then sent to the processor 112 for various processes, such as interpolation. An exposure control value will be generated by the processor 112 and this value will alter the settings of either the aperture 106 and/or the time integration device located inside the image sensor 108. The final image deemed to be suitable for output will either be displayed onto the display 114 or stored in the memory Card 116. The processor 112 performs the imaging processes.

Exposure is defined as the amount of light entering the image pickup apparatus 102. It can be calculated from the size of the aperture 106 given in terms of F-number, e.g. F4.5 and the shutter speed of the image pickup apparatus 102, given in terms of exposure time, e.g. 1/125 s. The exposure value can be calculated using the following formula:

$$EV \propto \frac{t}{N^2},$$

where EV is the exposure value, N is the F-number and t is the exposure time.

Figure 2:
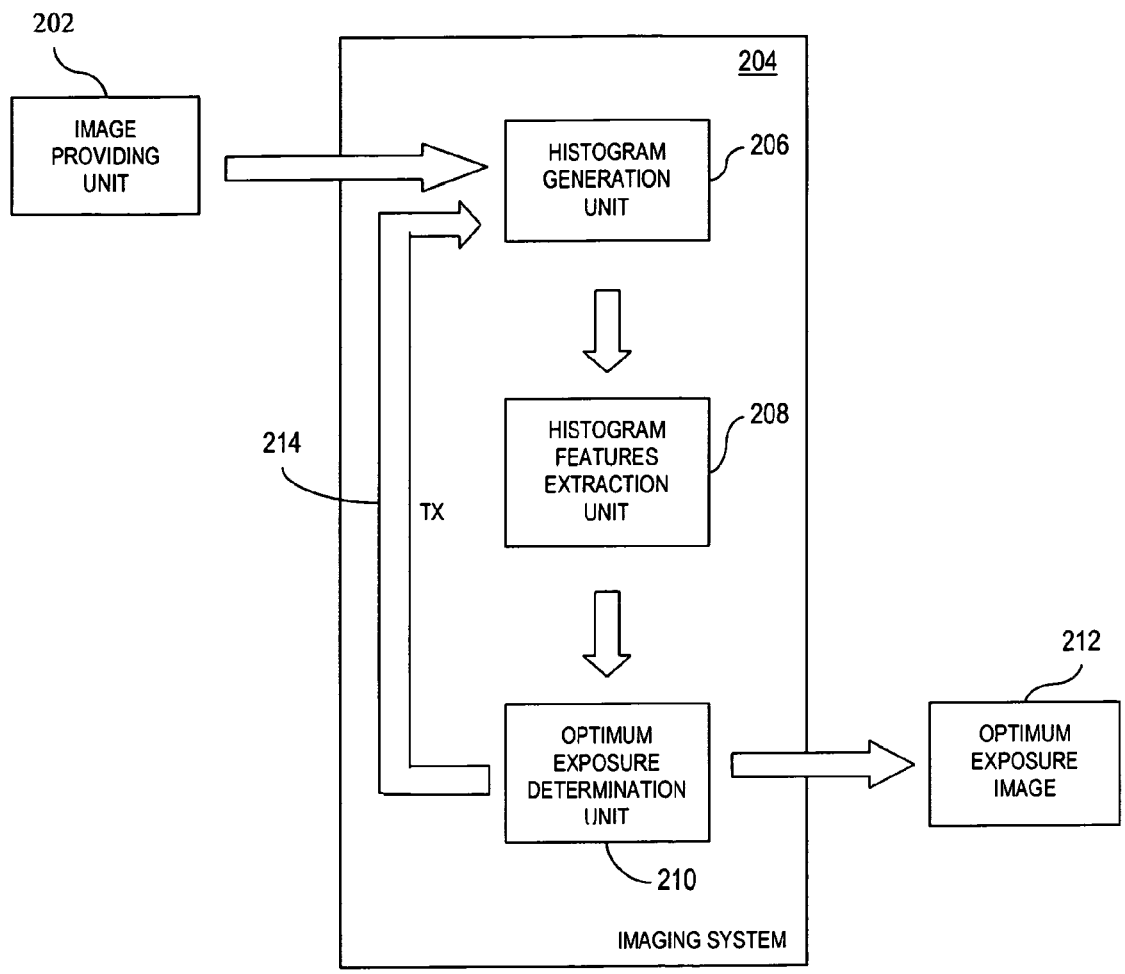
FIG. 2 is an illustration showing components of the imaging system.

FIG. 2 is a block diagram of an embodiment of an image system 204 with inputs and outputs. The imaging system 204 can be implemented as a part of the electronic device, for example as a processing unit in a digital camera or similar, such as the one described above. An image pickup apparatus can be a digital still camera but is not limited to such an embodiment. It can be a scanner, a digital photo kiosk, a computer with digital images or any device that can provide digital images to the imaging system 204 and memory to run the imaging system. An image providing unit 202 provides a digital image for the imaging system 204. An image providing unit can be a memory card, a hard-disk with digital images, or any device that can provide the imaging system 204 with digital images.

The imaging system 204 includes a histogram generation unit 206, a histogram features extraction unit 208, (or features extraction unit in short) and an optimum exposure determination unit 210 that provides an optimum exposure image 212. The histogram generation unit 206 generates histograms from the digital images provided by the image providing unit 202. The generated histograms are then sent to the features extraction unit 208, where various features of the histogram are measured and calculated. These features are input to the optimum exposure determination unit 210, where adequacy of exposure is measured based on these features. As shown by the arrow 214 the imaging system 204 operates in a loop fashion, where units 206, 208 and 210 are repeated until an image with an optimum exposure 212 is obtained. The optimum exposure determination unit 210 calculates and outputs a tentative exposure value, Tx to the Histogram Generation Unit 206 for each loop iteration.

Figure 3:
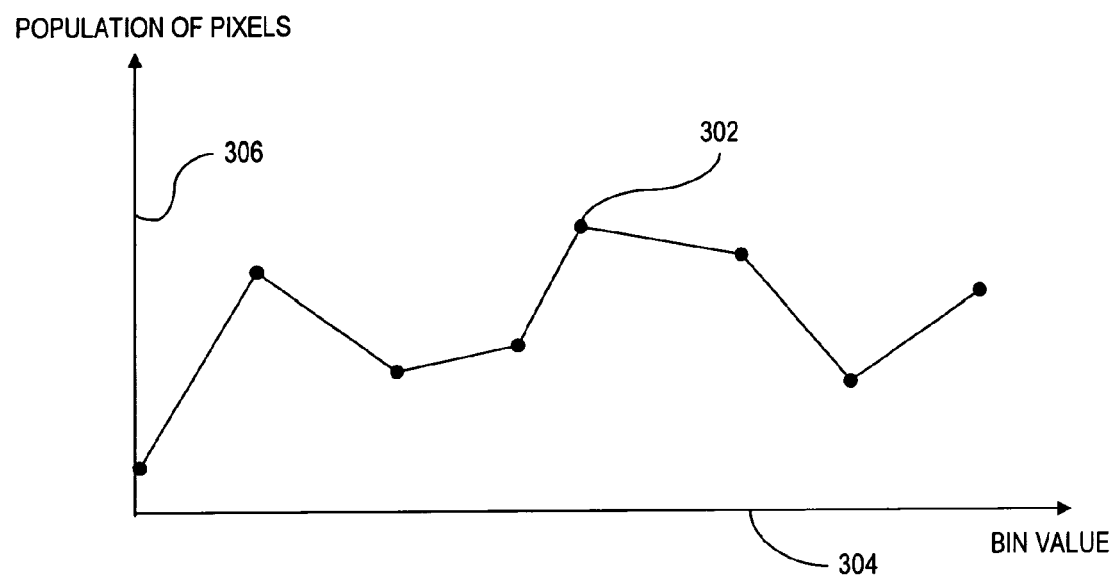
FIG. 3 is a graph showing an example of an image histogram.

FIG. 3 shows an example of a histogram generated from an image. An image histogram is a graphical representation of the number of pixels in an image as a function of intensity. The intensity of a pixel can be expressed as a digital number measuring a certain color, hue, brightness or other dimensions of light captured in the image. Histograms consist of vertices 302 which are points on the histogram. The x-axis 304 is made up of bins, each bin representing a certain intensity value range. The histogram is computed by examining all pixels and assigning each to a bin depending on the pixel intensity. The y-axis 306 represents the population of pixels of the image belonging to each bin. For example, a 256-bin red-channel histogram for an 8-bit RGB image with red channel values ranging from 0 to 255 has bin 1 representing red values of 0; bin 2 of 1 and so on, while a 16-bin histogram has bin 1 representing red channel values from 0 to 15; bin 2 from 16 to 31 and so on.

The dynamic range of an image refers to the ratio of the largest possible signal value, divided by the smallest non-zero signal value. For example, in an 8-bit RGB digital image, the largest signal value is 255 and the smallest non-zero signal value is 1. The dynamic range of an 8-bit image is 255. A low dynamic range (LDR) image typically refers to an 8-bit image with a dynamic range of 255, whereas an extended dynamic range (EDR) image refers to an image with a dynamic range greater than 255.

Referring to FIG. 2, the Histogram Generation Unit 206 receives digital LDR images and outputs a set of LDR histograms of a tentative LDR image. There can be a variety of embodiments in which this can be carried out, and a few of them are specified here. The feature extraction unit 208 receives the LDR histograms and calculates parameters of the histograms that can indicate significant features of the tentative image. The tentative image may or may not be generated by the imaging system 204, depending on the embodiment of histogram generation unit 206. The optimum exposure determination unit 210 within the imaging system 204 checks for adequate exposure of the tentative image by examining features it receives from the feature extraction unit 208. If the exposure is determined to be unsuitable for the scene, the optimum exposure determination unit 210 calculates a new tentative exposure value Tx for the next tentative image and provides the histogram generation unit 206 with Tx to produce a new tentative image with exposure Tx. A new tentative image of a different exposure is processed to generate a new histogram. The features are again extracted and there is a determination of exposure adequacy. This process is repeated until a tentative image is deemed to have suitable exposure and is provided as an output 212.

Figure 4:
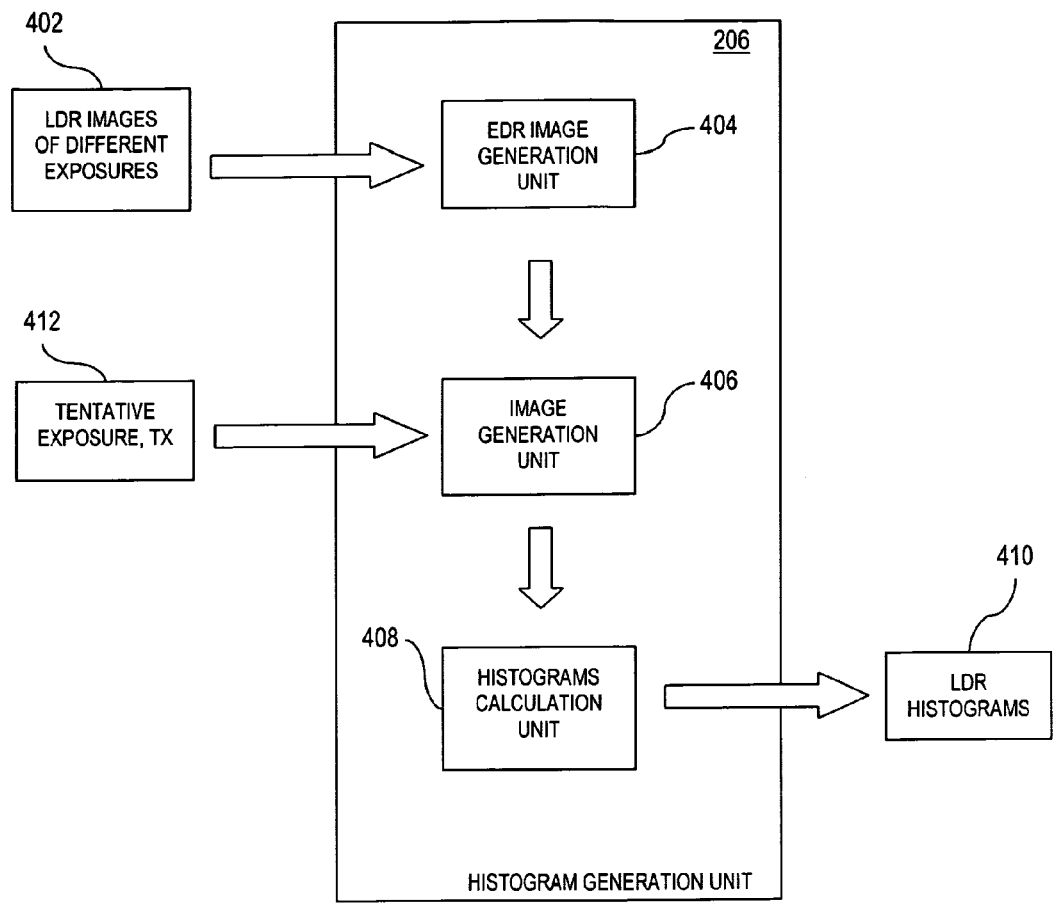
FIG. 4 is an illustration showing components of a first embodiment of a histogram generation unit.

FIG. 4 is a block diagram of an embodiment of the histogram generation unit 206. The unit receives a plurality of LDR images of different exposures 402 that are processed by an EDR image generation unit 404, an image generation unit 406 and a histograms calculation unit 408. The histogram generation unit 206 provides LDR histograms 410. Also, a tentative exposure value, Tx 412 is provided to the image generation unit 406.

Figure 5:
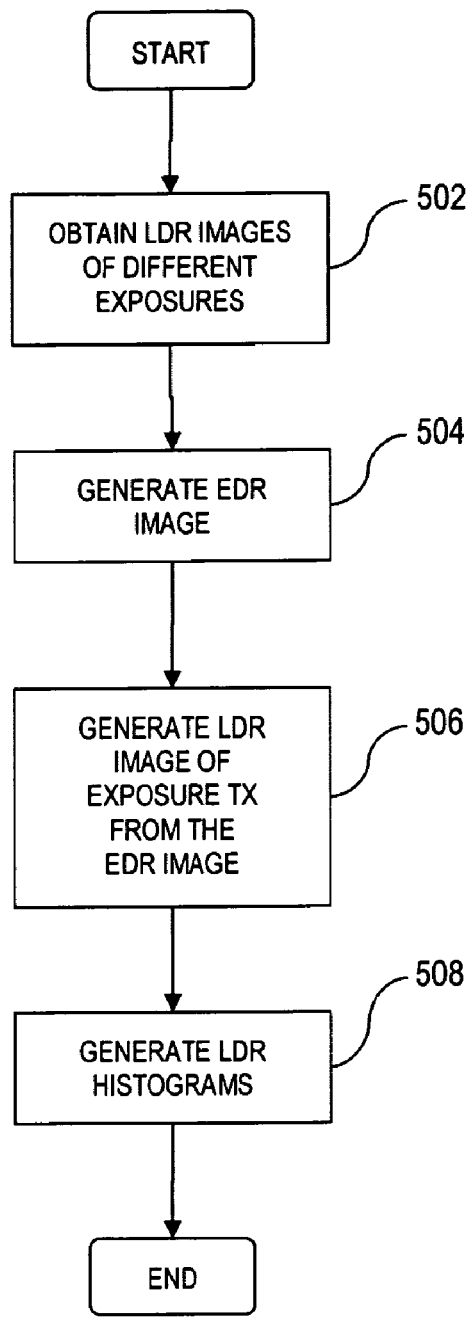
FIG. 5 is a flowchart describing the process of the first embodiment of the histogram generation unit.

FIG. 5 is a flowchart describing a process for generating histograms. A plurality of LDR images of different exposures are obtained in block 502 either using a exposure bracketing mode or any other method to obtain images of the same scene with different exposures. The EDR image is generated from the LDR images in block 504. An EDR image reduces the use of memory to store many LDR images of different exposures. This is because an LDR image of an exposure within a predefined range can be extracted from the EDR image, which has a range determined by the minimum exposure value, Tmin, and the maximum exposure value, Tmax, of the LDR images. In block 506 a single LDR image of a tentative exposure Tx is then generated from the EDR image. The Tx falls within the predefined range. LDR histograms of the image are generated from the single LDR image in block 508.

Figure 6:
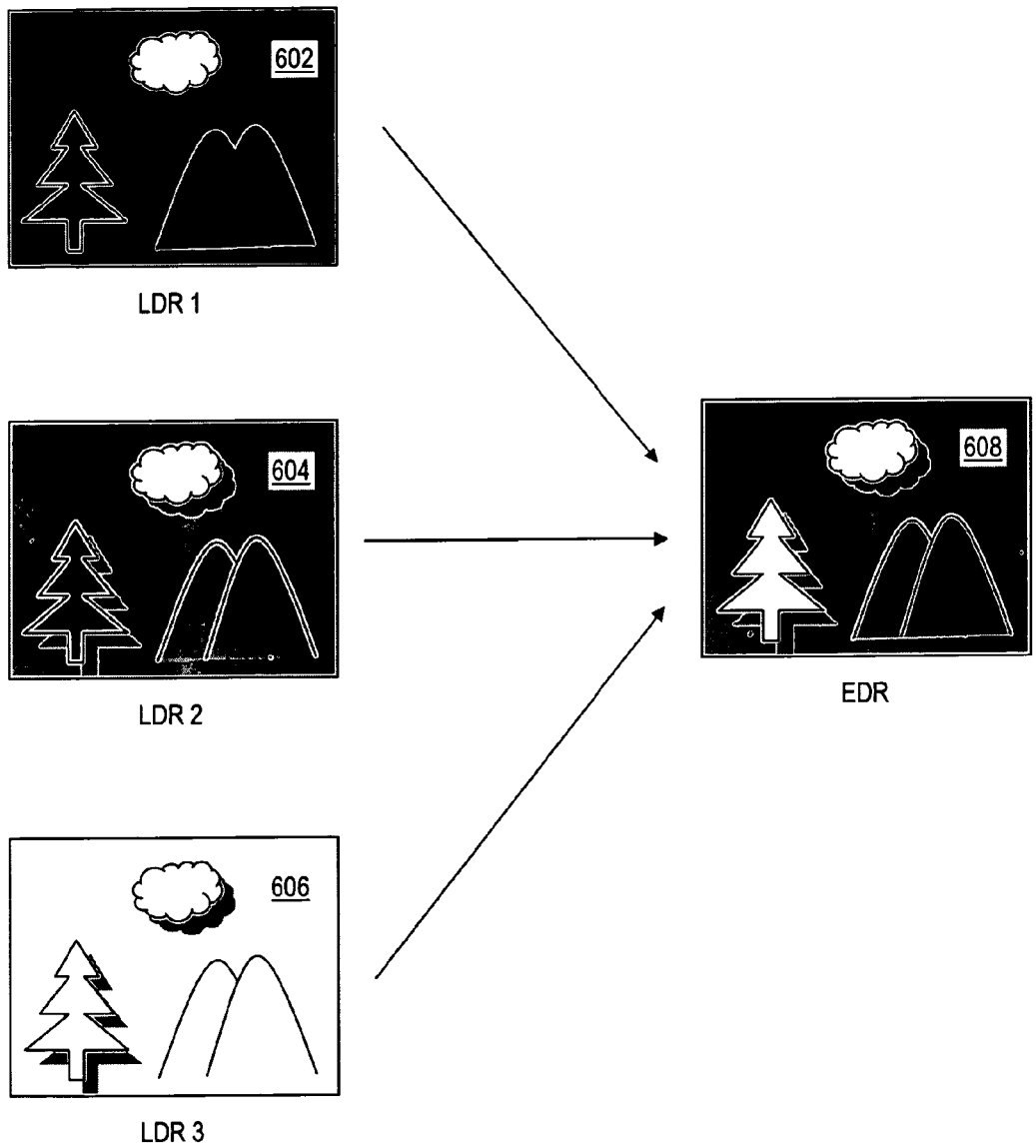
FIG. 6 are pictorial descriptions of three LDR images of different exposures composed together to form one EDR image.

FIG. 6 shows an example of an EDR image formed from three LDR images of different exposures. Three LDR images with increasing exposures are shown on the left hand side of FIG. 6, including LDR 1 602 with the lowest exposure, T1 (darkest), LDR 2 604 with exposure, T2 and LDR 3 606 with the highest exposure, T3 (brightest). Together, the LDR images are used to compose an EDR image 608 shown on the right hand side of FIG. 6. Each LDR image is an 8-bit RGB image in this example; hence the EDR image created is a 10-bit RGB image. A different number of LDR images may be used to compose an EDR image, as long as the number exceeds one. Hence the description is not meant to limit the method to compose an EDR image, but as a simplified explanation to help grasp the concept.

Figure 7:
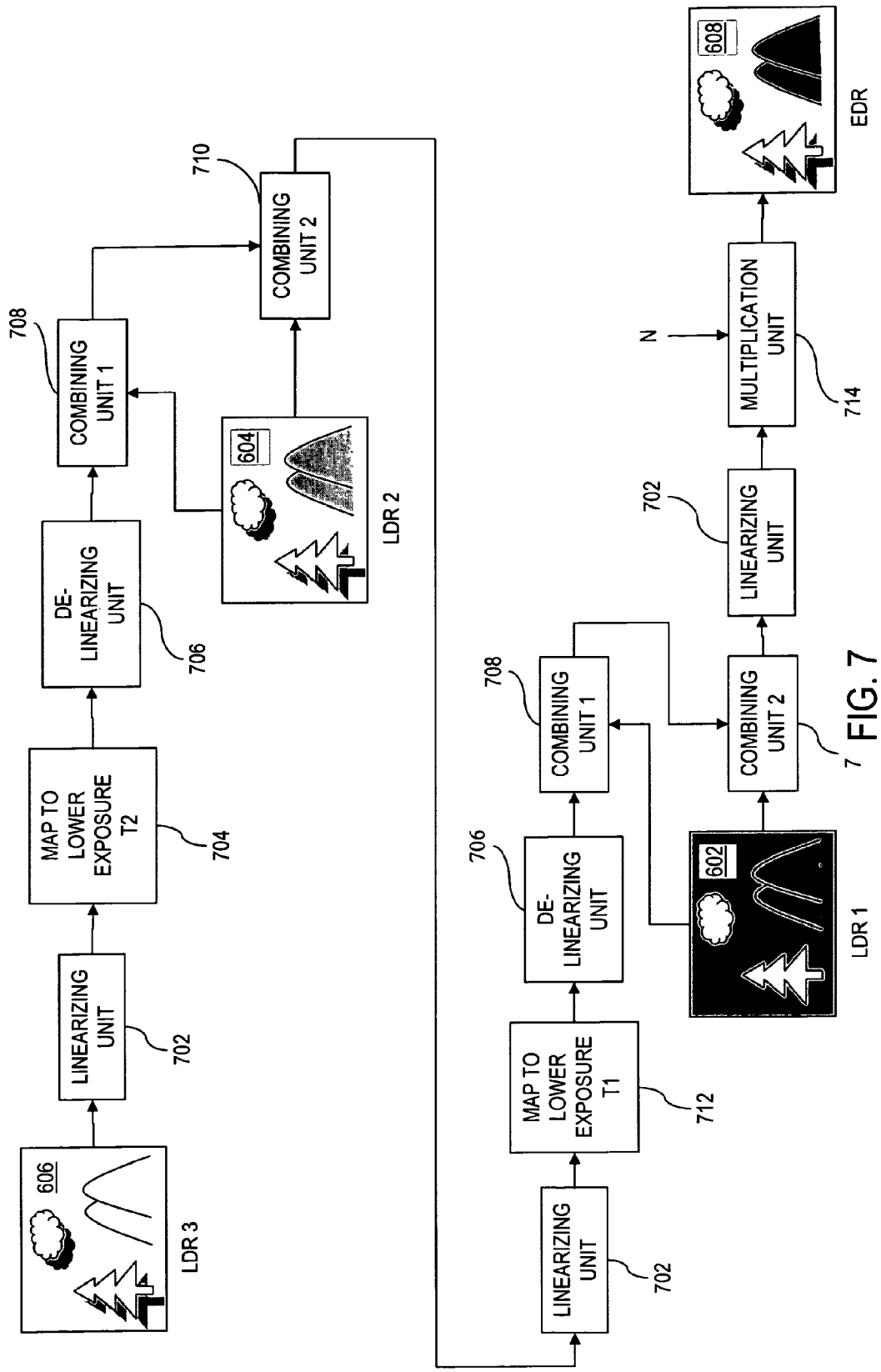
FIG. 7 is an illustration of a process for the composition of an EDR image from multiple LDR images.

FIG. 7 illustrates a process for creating an EDR image 608 from the three LDR images 602, 604, and 606. The brightest of the three shots, LDR 3 606 of exposure T3 provides the first input to the system. The LDR images may contain nonlinear distortions created during the image acquisition process. One example of nonlinear distortion occurs in the image pickup device wherein the analog circuit therein may have an amplifying gain that varies with signal level. A second example is the sensing node of the image pickup device has a capacitance value that varies with signal level. A third example is where LDR pictures receive gamma pre-distortion commonly found when producing digital images for computer displays. LDR 3 606 is processed by a linearizing unit 702, which applies a linearizing function on the intensity values of each pixel to remove the nonlinear distortions. The linearizing function transforms the images from non-linear to linear images. An example of a gamma function and a corresponding inverse gamma function is shown below. The gamma function:

$$y = 255 \frac{\left(1 - e^{-\frac{x}{255} \times G}\right)}{(1 - e^{-G})};$$

For an 8-bit image

The inverse gamma function:

$$x = -\frac{255}{G} \log\left(1 - \frac{y}{255}(1 - e^{-G})\right);$$

For an 8-bit image.

The intensity values of the linearized LDR 3 are then mapped to a lower exposure value T2 by mapping unit 704. T2 is the exposure value of the darker image LDR 2 604. This is done by multiplying the ratio of T2 to T3 (i.e. T2/T3) since the intensity values of the linearized LDR 3 606 are already made linear by the Linearizing Unit 702. The resultant image is processed by a de-linearizing unit 706. The output of unit 706 is combined with the intensity values of LDR 2 604 by a combining unit 1 708.

The combination is done by replacing "brighter pixels" in the output of the de-linearizing unit 706 with the LDR 2 604 pixels to form one output image. A "brighter pixel" in the output of de-linearizing unit 706 is a pixel where at least one color channel has an intensity value that exceeds a first predetermined threshold, e.g. 127 for intensity values between 0 and 255. Combining Unit 2 710 replaces the "dimmer pixels" of LDR 2 604 with pixels in the output of Combining Unit 1 708. A "dimmer pixel" in LDR 2 604 is a pixel where at least one color channel has an intensity value below a second predetermined threshold, the second predetermined threshold may or may not be identical to the first predetermined threshold. The combined operation of combining unit 1 708 and combining unit 2 710 is equivalent to replacing a "dimmer pixel" in LDR 2 with the output of the de-linearizing unit 706, if and only if the latter is not a "brighter pixel".

This operation avoids a kind of image artifact described below. If a scene has brightness that gradually changes monotonically across the frame, the LDR 2 604 pixels are replaced with the output of the de-linearizing unit 706 where the pixels become dimmer. However, due to some inaccuracy in linearizing or de-linearizing, the output from the de-linearizing unit 706 is slightly brighter than it is supposed to be. What shows up in the resultant image is an edge where the brightness in the scene crosses over the threshold. Combining Unit 708 checks to make sure that the output pixels of the de-linearizing unit 706 is not brighter; otherwise LDR 2 pixels will be kept.

The output image of unit 710 is processed by the same process as LDR 3 606 above except that it is now re-mapped to an even lower exposure value T1 by mapping unit 712, T1 being the exposure value of the darkest image LDR 1 602. The second input image to the two combining units 708 and 710 is changed to LDR 1 602. The output image at the second combining unit 2 710 is then processed by linearizing unit 702. The resultant image is multiplied with a multiplier N, by a multiplication unit 714. N is the ratio of the maximum exposure, Tmax to the minimum exposure value, Tmin of the plurality if LDR images (i.e. Tmax/Tmin). The ten-bit EDR image 608 is produced by unit 714.

Figure 8:
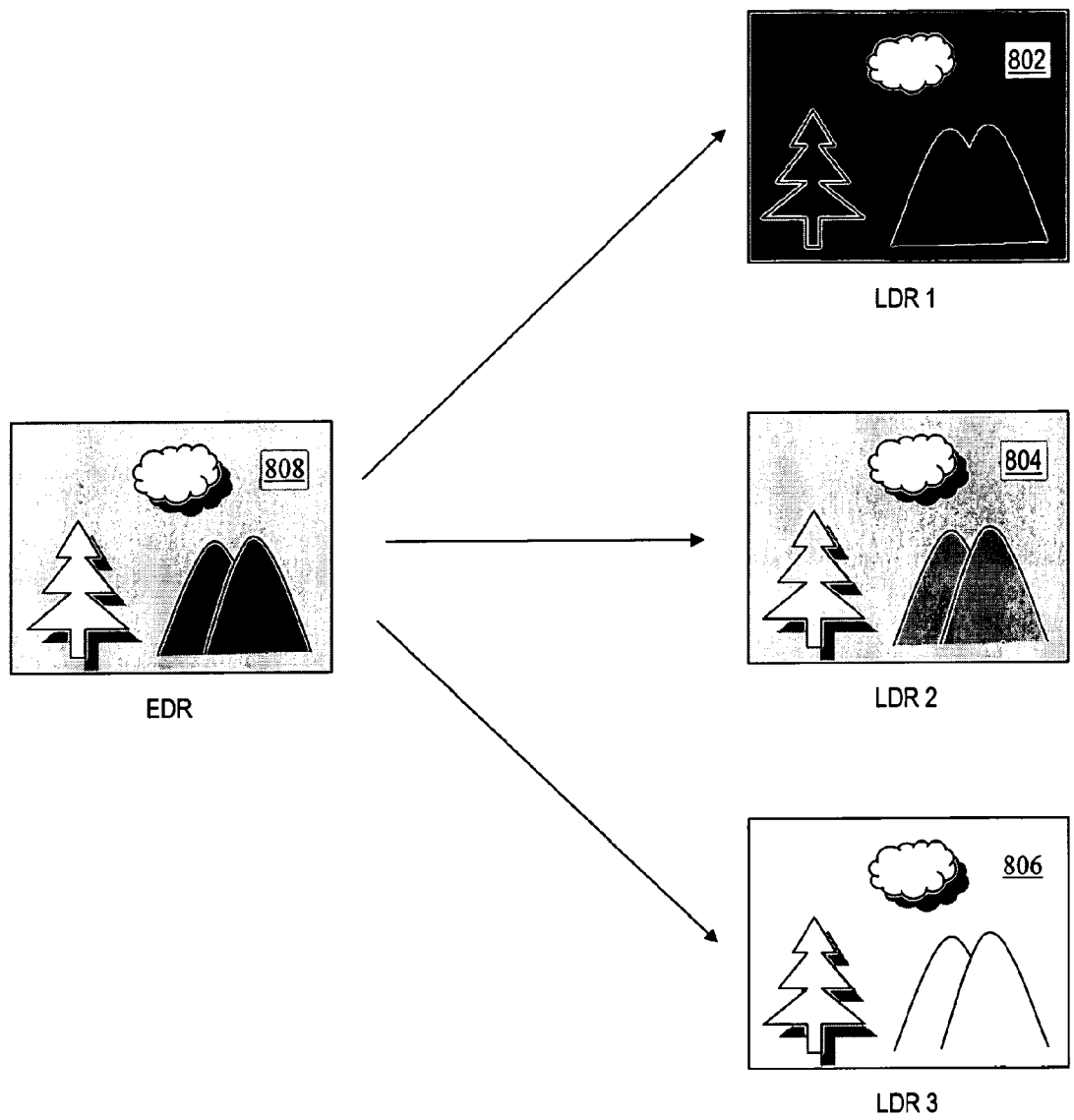
FIG. 8 are pictorial descriptions of the extraction of three LDR images of different exposures from an EDR image.

Referring to FIG. 4, after an EDR image is generated from the EDR image generation unit 404, a tentative LDR image with a tentative exposure is generated from image generation unit 406. The tentative exposure value of the LDR image is between the minimum and maximum exposure values of the plurality of LDR images 402 used to create the EDR image. For example as shown in FIG. 8, three LDR images 802, 804 and 806 are extracted from an EDR image 808. These three images have exposures with values between Tmin and Tmax, which are the minimum exposure value and maximum exposure value, respectively.

Figure 9:
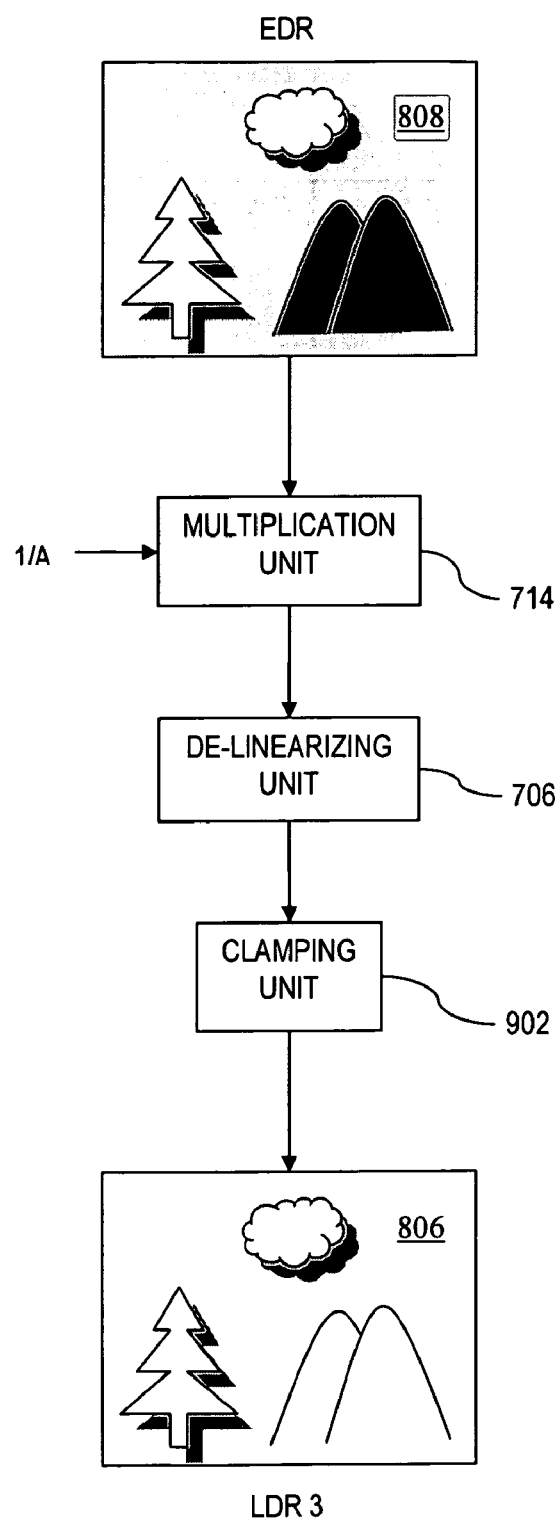
FIG. 9 shows a flowchart describing the generation an LDR image from an EDR image.

FIG. 9 illustrates how an LDR image 806 is generated from an EDR image 808. First the intensity values of the EDR image 808 are processed by the multiplication unit 714 similar to that shown in FIG. 7. The intensity values of the EDR image 808 are multiplied with a multiplier 1/A at 714, where A is the ratio of the maximum exposure to the tentative exposure value for the LDR 3 image 806. The multiplied EDR image is processed by the de-linearizing unit 706, and a clamping unit 902, which clamps the intensity values of the image such that the image becomes an LDR image. For example if a system defines an LDR image as any 8-bit image, the system will clamp the intensity values of de-linearized EDR image 806 to a maximum value of 255. The LDR 3 806 is the output of the clamping unit 902.

Figure 10:
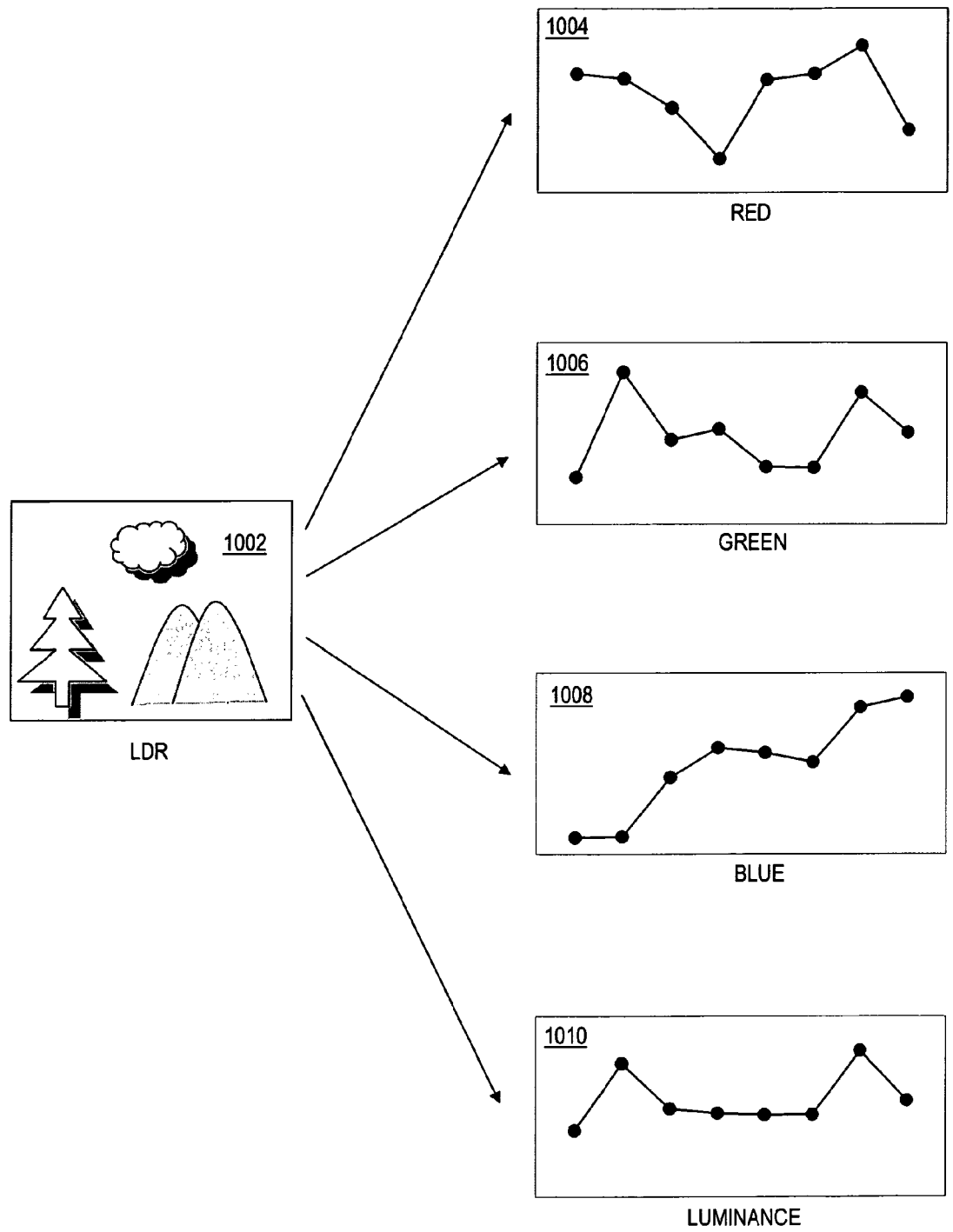
FIG. 10 are pictorial descriptions of the generation of histograms from four different channels: Red, Green, Blue and Luminance from one LDR image.

Referring to FIG. 4, the Histogram Calculation Unit 408 receives the tentative LDR image created by the image generation unit 406 and calculates tentative LDR histograms based on the tentative LDR image and a tentative exposure value Tx. FIG. 10 shows the calculation of four LDR histograms 1004, 1006, 1008 and 1010 from an LDR image 1002 for four different intensity channels; namely, a red channel 1004, a green channel 1006, a blue channel 1008 and a luminance channel 1010. Other color space histograms such as HSV histograms or CMYK histograms can also be calculated, but are not shown in the drawings.

Figure 11:
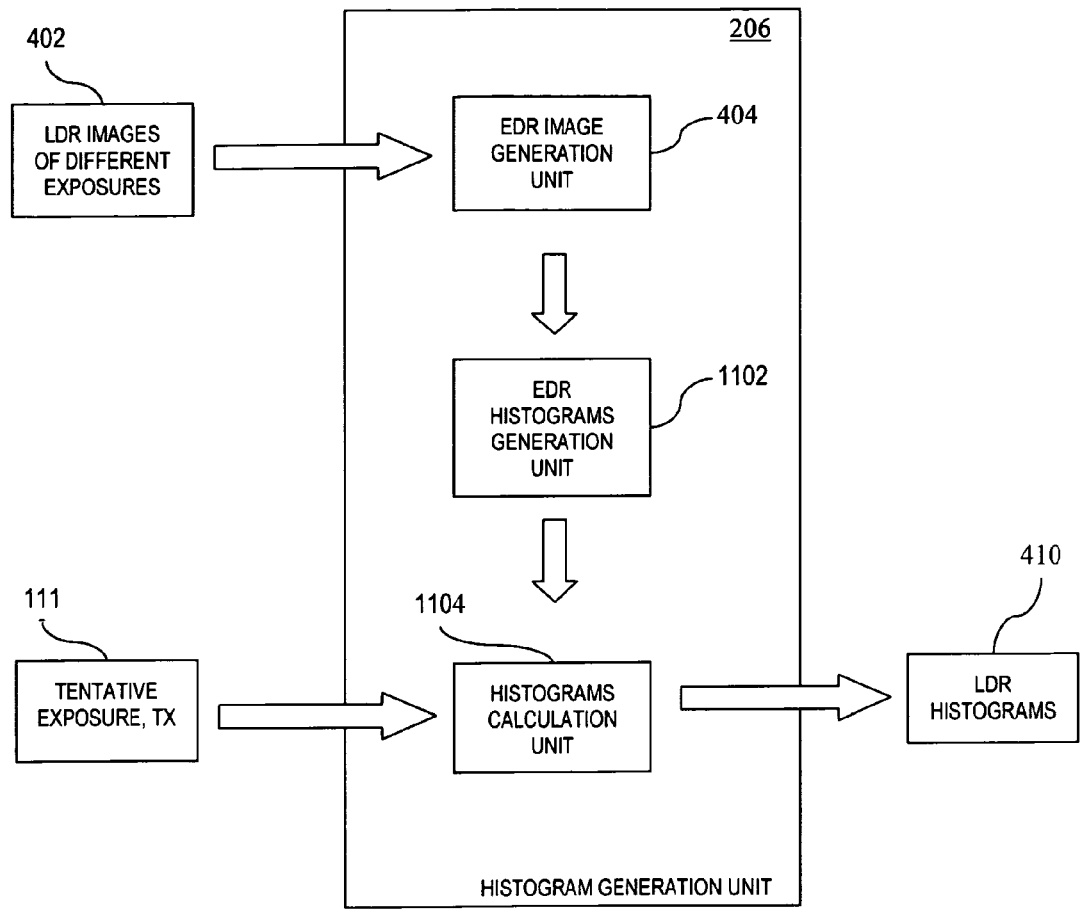
FIG. 11 is an illustration of a second embodiment of the histogram generation unit.

FIG. 11 shows another embodiment of a histogram generation unit 206. The histogram generation unit 206 creates EDR histograms from an EDR image then further creates tentative histograms from the EDR histograms, instead of creating a tentative LDR image. The unit 206 then creates a set of tentative LDR histograms as in the previous embodiment. Similar to the previous embodiment, LDR images of different exposures 402 are used to create an EDR image in EDR image generation unit 404. The EDR image is then used to create corresponding EDR histograms based on the pixel intensity values of the EDR image by an EDR histograms generation unit 1102. LDR histograms 410 are then calculated from the EDR histograms in the histograms calculation unit 1104 using the tentative exposure, Tx 412.

A histogram is usually generated from an image of a certain exposure value. In this embodiment, LDR histograms can be generated directly from an EDR histogram without generating LDR images. An LDR histogram generated from an EDR histogram at a particular exposure value corresponds to the LDR histogram generated from an LDR image of the same exposure value. Hence, an LDR histogram having a specific exposure value is defined as the same LDR histogram that will be generated from an image of that specific exposure value.

Figure 12:
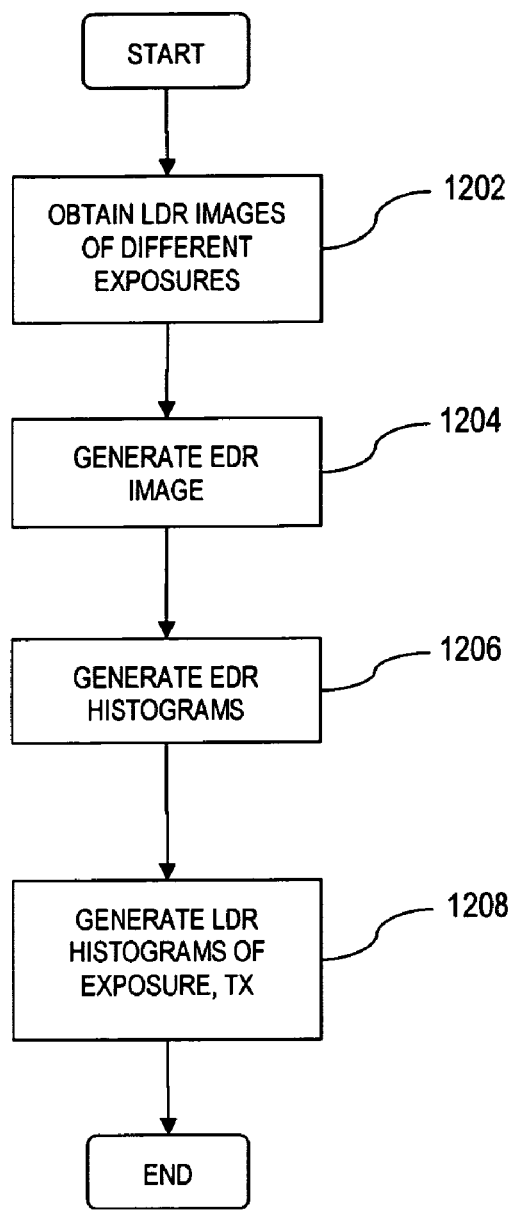
FIG. 12 shows a flowchart describing a process of the second embodiment of the histogram generation unit.

FIG. 12 is a flowchart for a process to generate an LDR histogram. A plurality of LDR images of different exposures is first obtained in block 1202. The LDR images are used to generate an EDR image in block 1204. In block 1206 EDR histograms are then calculated from the EDR image. Finally, a tentative exposure, Tx is used to generate tentative LDR histograms from the EDR histograms in block 1208.

Figure 13:
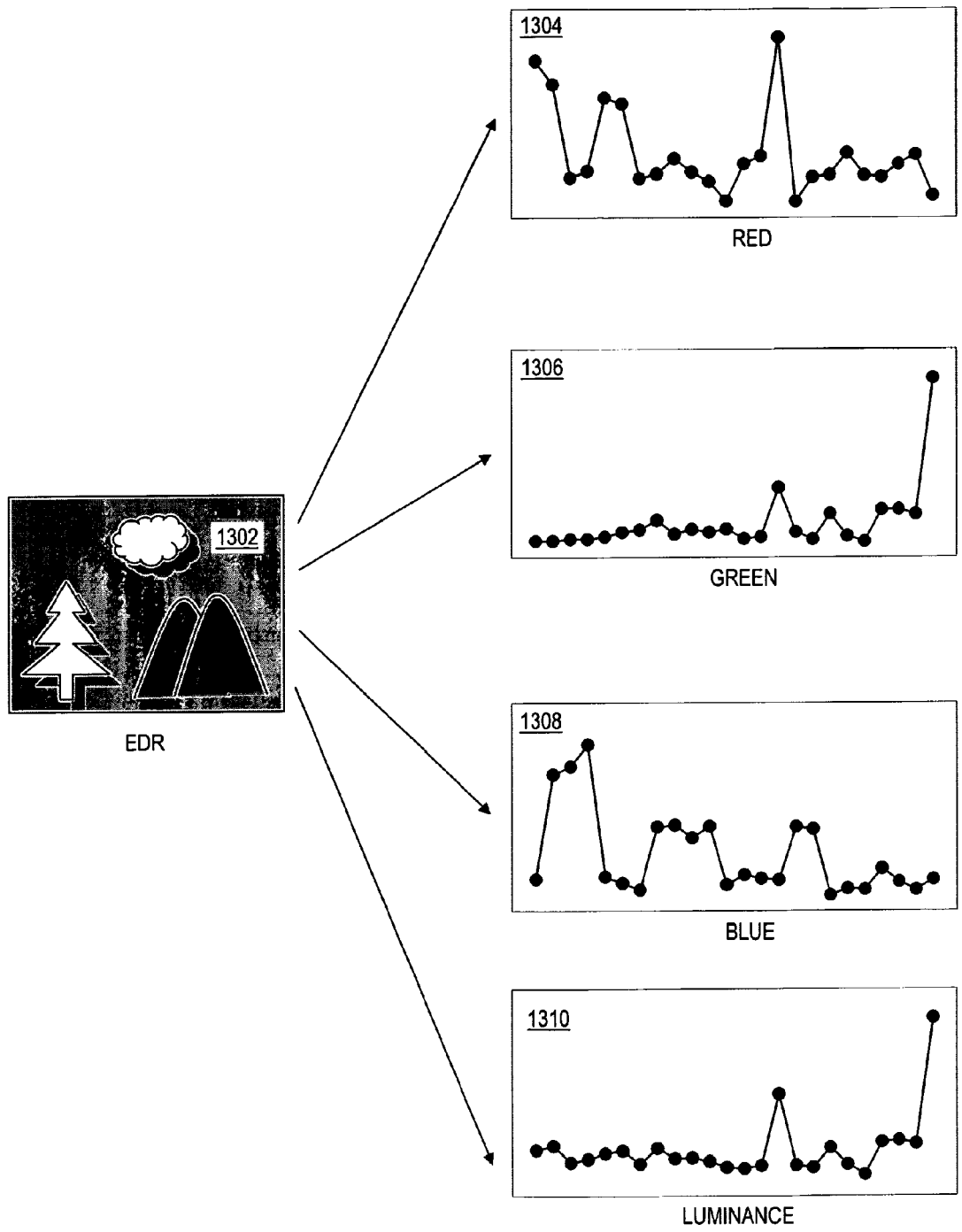
FIG. 13 are pictorial descriptions of the generation of EDR histograms from four different channels: Red, Green, Blue and Luminance from one EDR image.

FIG. 13 is an illustration showing the creation of EDR histograms. An EDR histogram is calculated in the same way that an LDR histogram is calculated from an LDR image. The population of pixels in the EDR image belonging to each bin is counted and this becomes the y-value of the EDR histogram for each bin. On the left-hand side of FIG. 13, an example of an EDR image 1302 is shown. Using the pixel intensity values of the EDR image 1302, four EDR histograms 1304, 1306, 1308 and 1310 are generated. The four histograms corresponding to the four intensity channels: red, green, blue and luminance (brightness) respectively are shown on the right hand side of FIG. 13.

Figure 14:
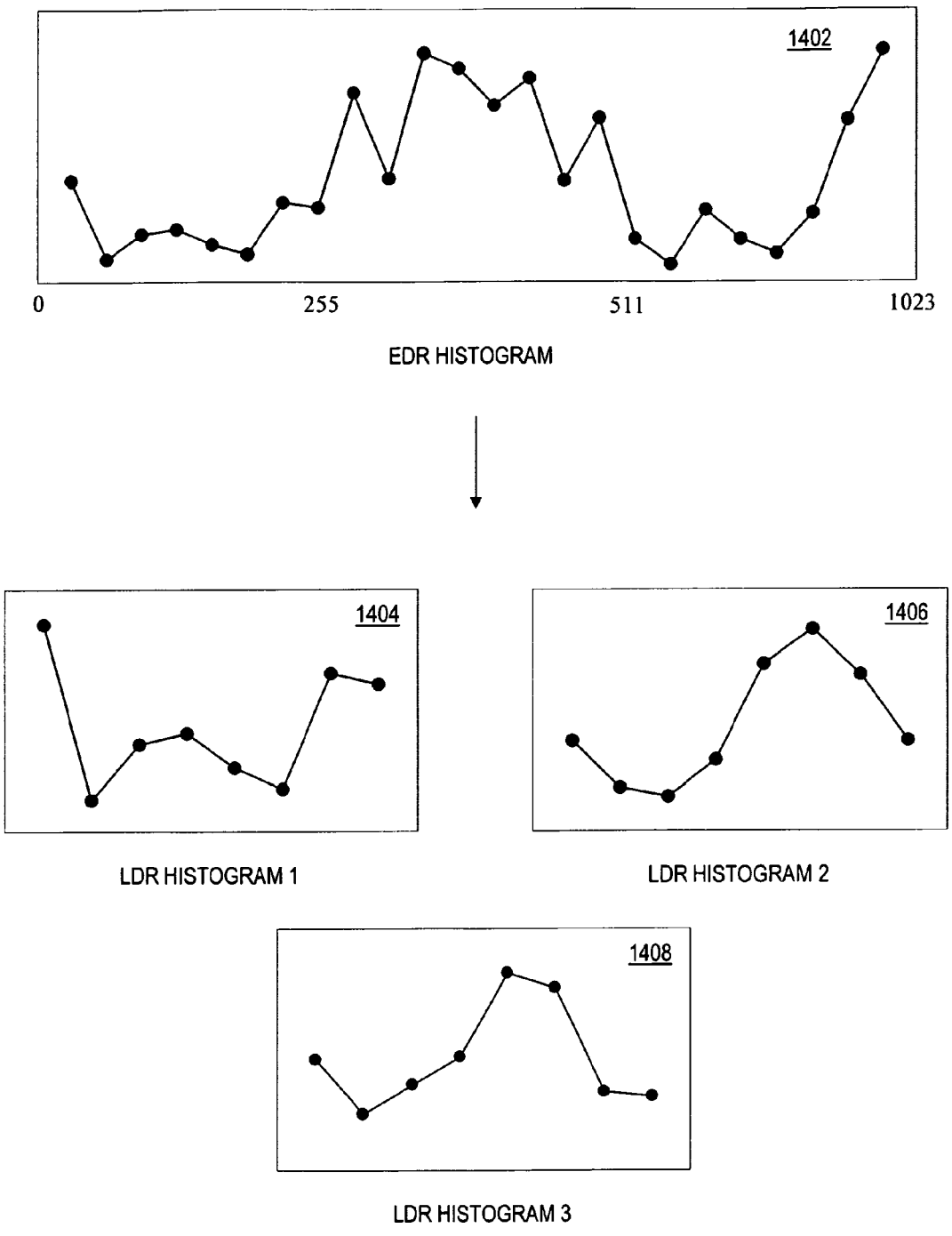
FIG. 14 includes a number of graphs depicting the generation of three LDR histograms from an EDR histogram.

FIG. 14 shows a EDR histogram 1402 and a plurality of LDR histograms 1404, 1406 and 1408. For a 10-bit EDR image which was composed from 8-bit LDR images, the EDR histogram 1402 generated from the EDR image has bin values extending from 0 to 1023. The LDR histograms 1404, 1406, and 1408 extracted from the EDR histogram will have bin values from 0 to 255. Extraction of LDR histograms from an EDR histogram is similar to how LDR images are extracted from an EDR image.

Figure 15:
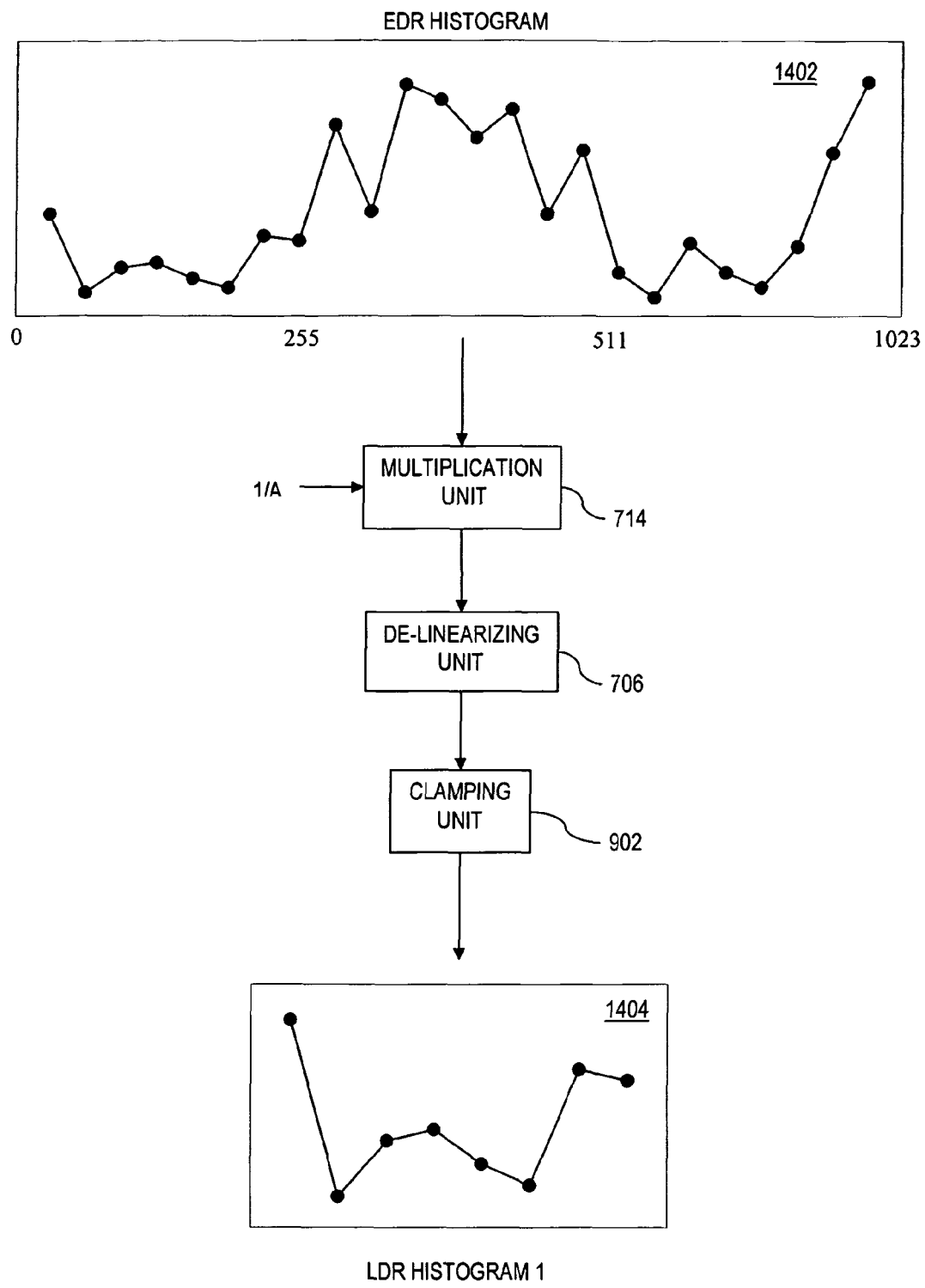
FIG. 15 is a flowchart showing the extraction of LDR histograms from one EDR histogram.

FIG. 15 shows an embodiment for extracting an LDR histogram 1404 from an EDR histogram 1402. Similar to FIG. 9, FIG. 15 shows the EDR histogram 1402 being processed by a multiplication unit 714, a de-linearizing unit 706 and a clamping unit 902 to create the LDR histogram 1 1404. The bin values of the EDR histogram 1402 is first processed by the multiplication unit 714 where values are multiplied with a multiplier 1/A, where A is the ratio of the maximum exposure to the exposure value of the LDR histogram 1 1404. Thereafter, the multiplied EDR histogram is then processed by the de-linearizing unit 706, and a clamping unit 902, which clamps the bin values of the resultant histogram to a maximum value of 255.

Similar to the concept of an EDR image being composed from multiple LDR images, an EDR histogram can also be composed from multiple LDR histograms. Hence, this process is also reversible, such that, LDR histograms can be extracted from an EDR histogram. Two different bins of an EDR histogram can map to the same bin of the LDR histogram, in which case the populations of both bins of the EDR histogram are summed to produce the population of the LDR histogram's bin. In general, populations of all EDR histogram bins that map to the same LDR histogram bin are summed together to produce a population for the latter.

Figure 16:
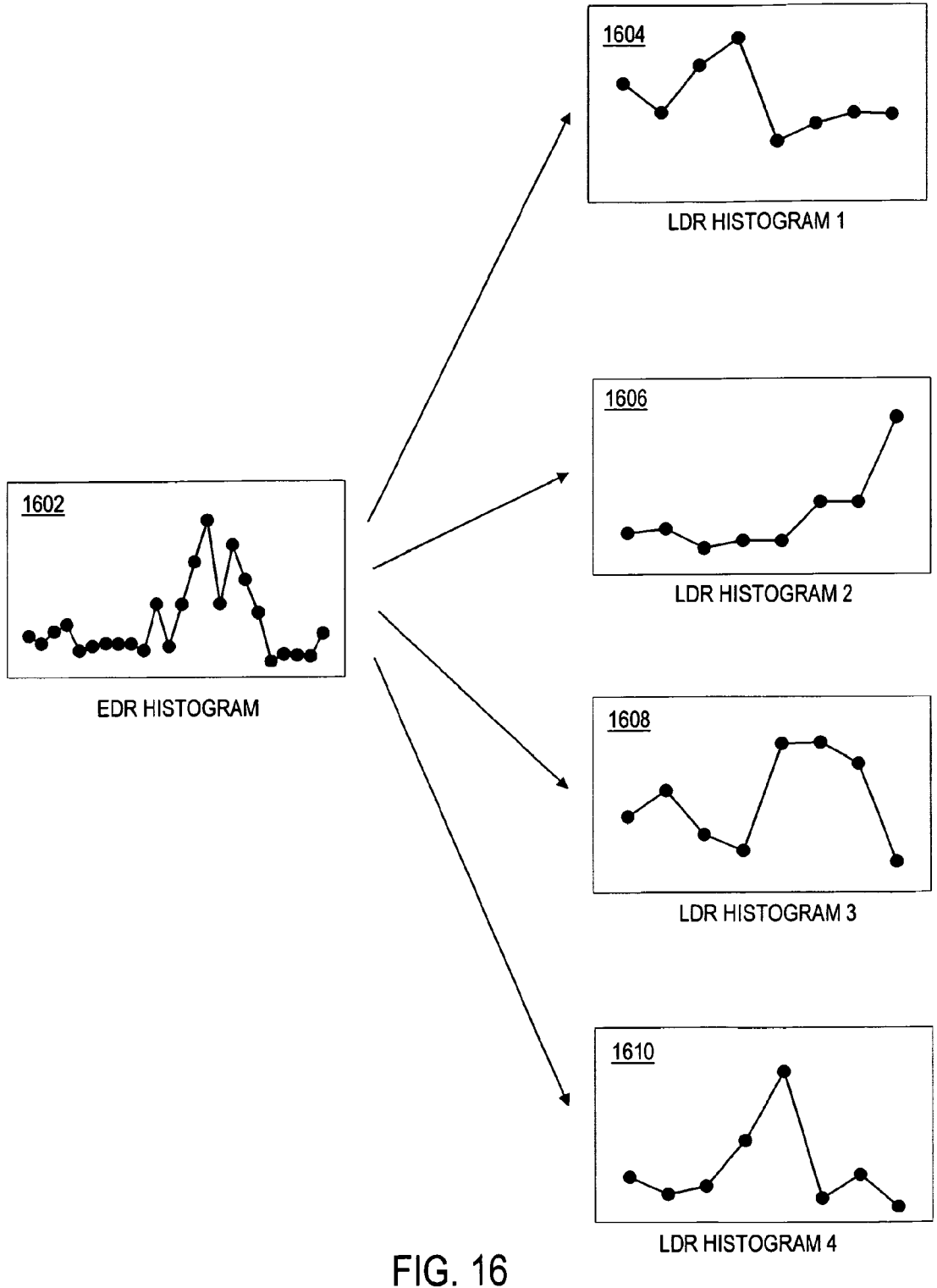
FIG. 16 includes a number of graphs depicting the generation of four different LDR histograms, each with a different exposure from an EDR histogram.

FIG. 16 provides an illustration where four different exposure values, T1, T2, T3 and T4 are used to create LDR Histogram 1 1604, LDR Histogram 2 1606, LDR Histogram 3

1608 and LDR Histogram 4 1610 from an EDR histogram 1602, respectively. Each LDR histogram represents the LDR histogram that will be calculated from the pixel intensity of an LDR image at that same exposure value.

As compared to the previous embodiment, this embodiment has the advantage of using less memory space of a processor and reduces the processing time as well. This is due to the memory used to store a histogram is significantly less than that of its corresponding image. Furthermore, calculation of a histogram from an image also takes significantly more computational steps and memory space than extraction of an LDR histogram from an EDR histogram. Memory capacity of a processor is fairly limited, and the use of less memory space allows the space to be used for other processes and purposes. Reduction of processing time allows faster reaction time to capture a scene at its optimum exposure level. Hence this embodiment has the advantage of computational efficiency over the other embodiments.

Figure 17:
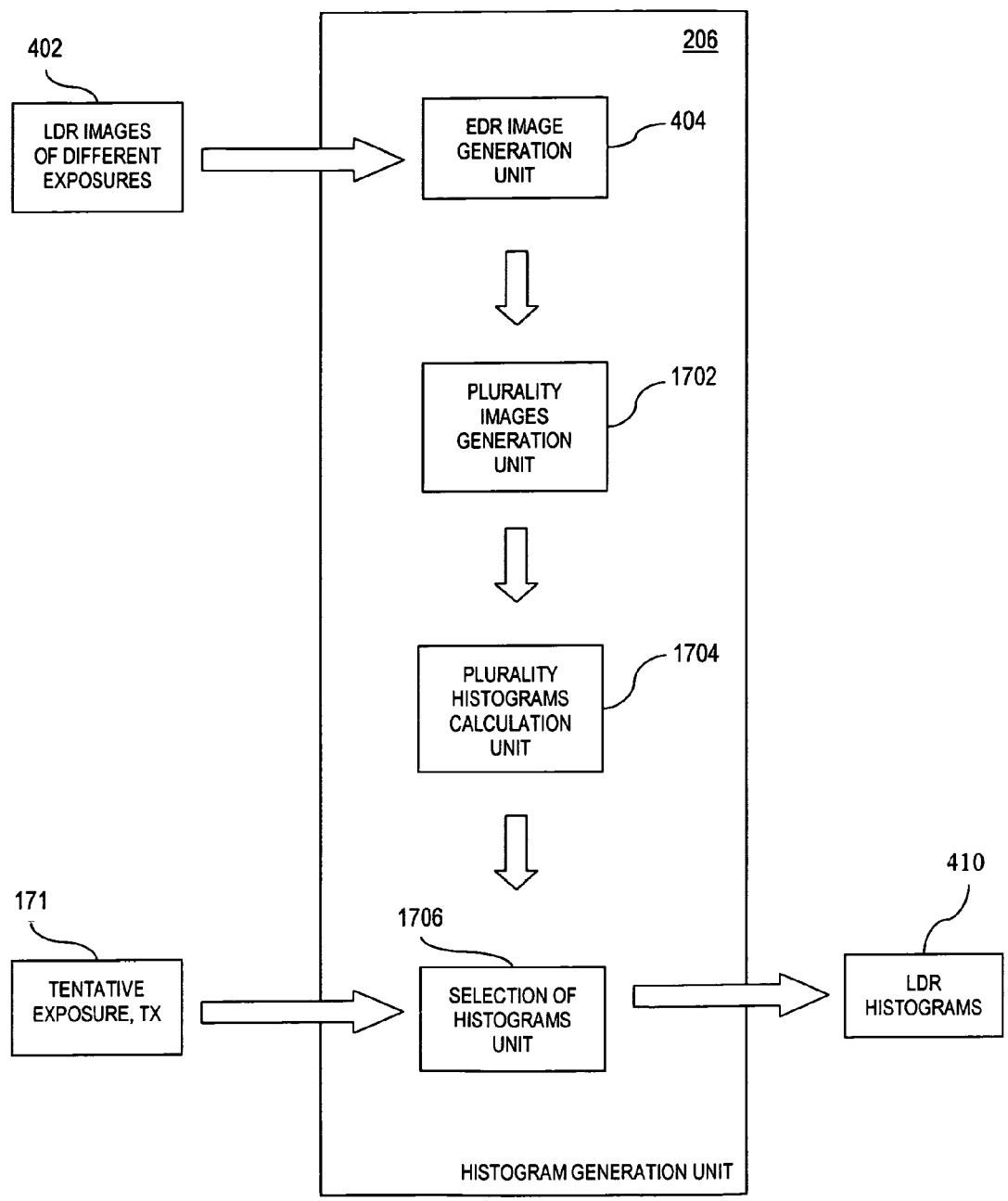
FIG. 17 is an illustration for a embodiment of histogram generation unit.

A third embodiment generates LDR histograms by generating a series of LDR images with different exposures from an EDR image as shown in the block diagram of FIG. 17. In this embodiment, similar to the previous two embodiments, an EDR image is generated. A first plurality of LDR images of different exposures 402 is needed for the composition of the EDR image by the EDR image generation unit 404. A second plurality of LDR images is generated by a plurality images generation unit 1702 and a plurality histograms calculation unit in 1704 to form LDR histograms 410 from each image in the second plurality of LDR images. A tentative exposure, Tx 412 is used by a selection of histograms unit 1706 to select LDR histograms 410 that are provided by the system.

Figure 18:
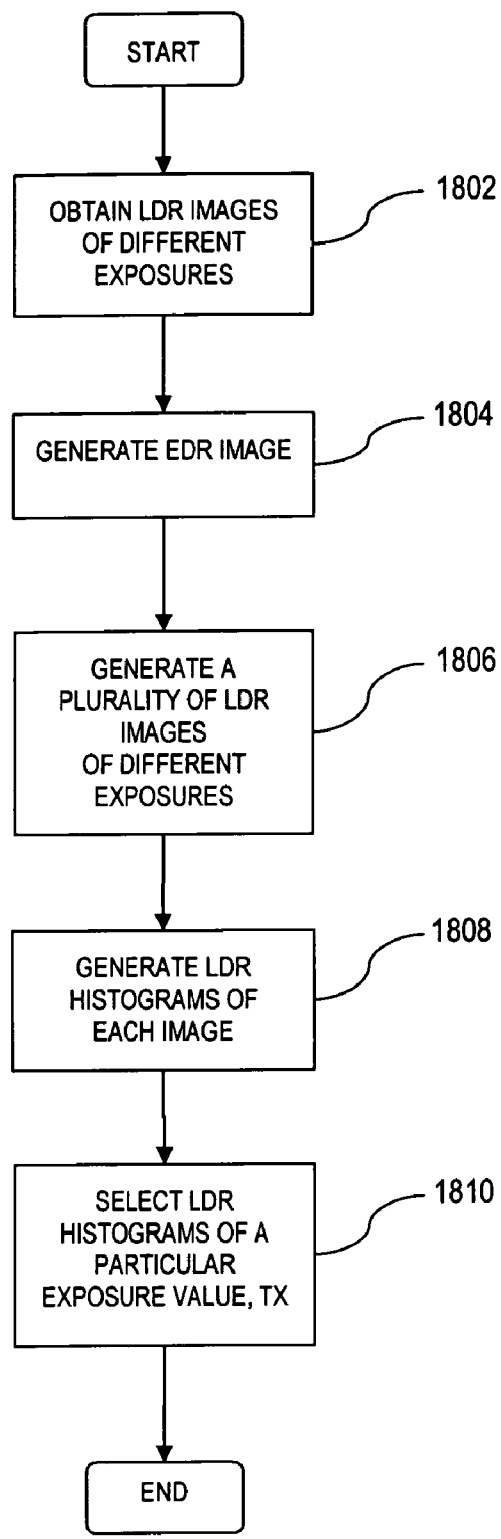
FIG. 18 is a flowchart illustrating the steps for the third embodiment of histogram generation unit.

FIG. 18 further elaborates the process of this embodiment. As was discussed with the previous two embodiments, a first plurality of LDR images of different exposures are obtained in block 1802 and are used to generate an EDR image in block 1804. In block 1806 a second plurality of LDR images of different exposures are then generated from the EDR image. The exposures of these LDR images generated may or may not be the same as the exposures of the LDR images obtained in block 1802. From each image, LDR histograms corresponding to the pixel intensities of LDR images are calculated in block 1808. LDR histograms corresponding to any particular LDR image at a particular exposure, Tx are selected from the plurality of LDR histograms in block 1810. Re-selection of LDR histograms can be done if the exposure value of the image corresponding to this set is deemed to be unsuitable by the optimum exposure determination unit 210 (see FIG. 2).

Figure 19:
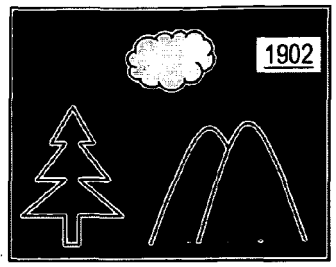
FIG. 19 illustrate four LDR images with corresponding red channel histograms.
Figure 19:
Figure 19:
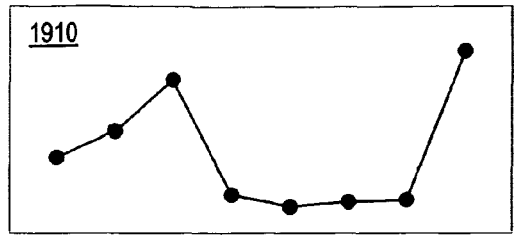
Figure 19:
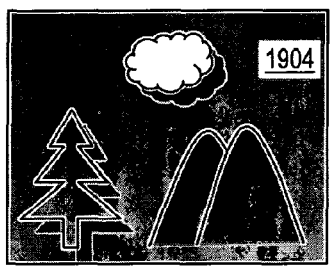
Figure 19:
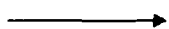
Figure 19:
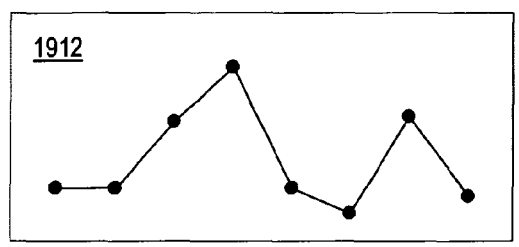
Figure 19:
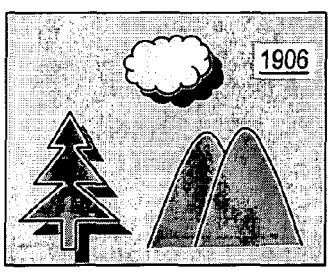
Figure 19:
Figure 19:
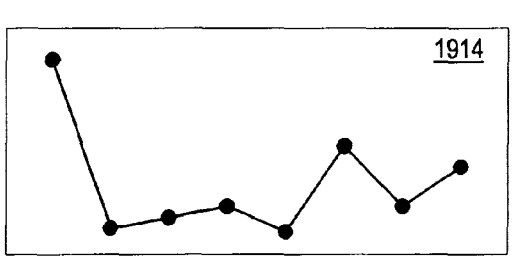
Figure 19:
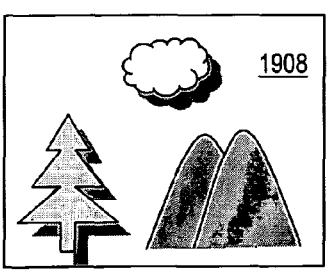
Figure 19:
Figure 19:
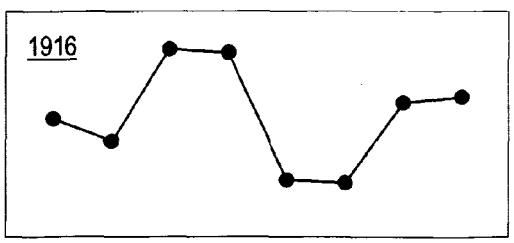

FIG. 19 shows four LDR images, LDR 1 1902, LDR 2 1904, LDR 3 1906, and LDR 4 1908, each with different exposures, that are used to generate corresponding histograms in block 1806 of the embodiment shown in FIG. 18. In this example, a number of histograms from different color channels are generated for each LDR image. For simplicity only the histograms from the red channel are shown here out of the various channels available. Shown are Red 1 1910, Red 2 1912, Red 3 1914, and Red 4 1916, respectively belonging to LDR 1 1902, LDR 2 1904, LDR 3 1906, and LDR 4 1908.

Figure 20:
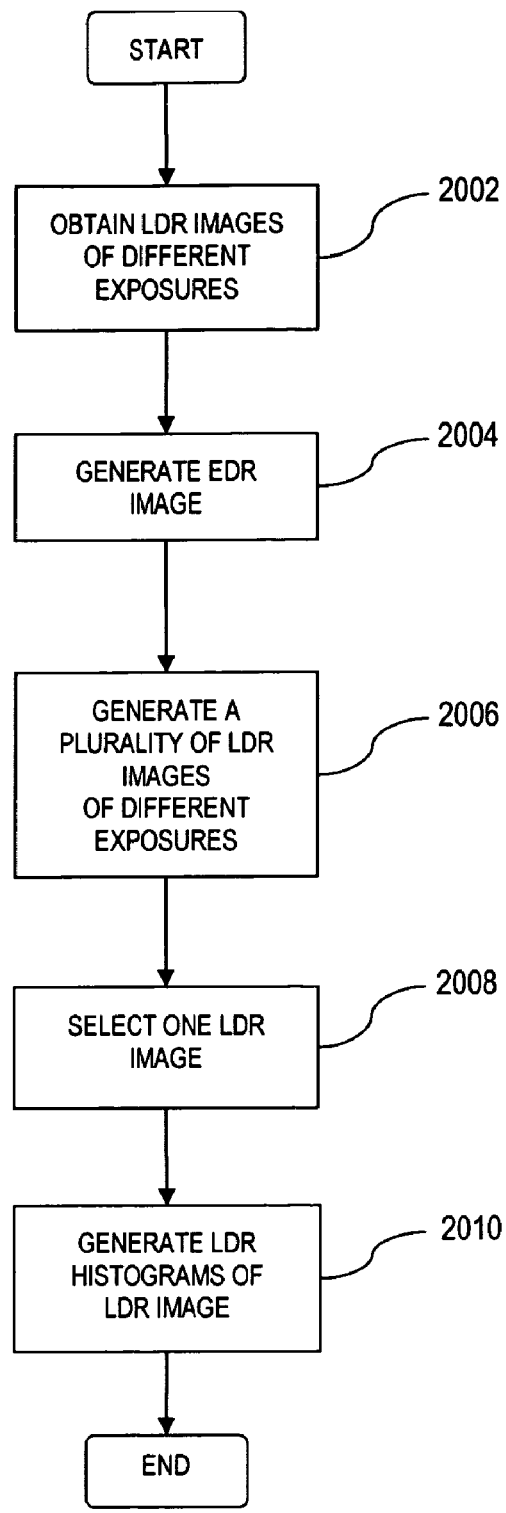
FIG. 20 is a flowchart illustrating the steps for a fourth embodiment of histogram generation unit.

FIG. 20 shows another embodiment which is similar to the embodiment shown in FIG. 17. LDR images of different exposure are obtained in block 2002, which are then used to generate the EDR image in block 2004. A plurality of LDR images of different exposures is then generated in block 2006. The exposure values of the LDR images may or may not be the same as the exposure values of the LDR images obtained in block 2002. Instead of creating histograms for all the images generated as described in the third process embodiment, one LDR image is selected from the plurality of LDR images in block 2008. LDR histograms of this image are then calculated in block 2010. Re-selection of the LDR image can be done if the image is deemed to be of unsuitable exposure value by the optimum exposure determination unit 210 (see FIG. 2).

Figure 21:
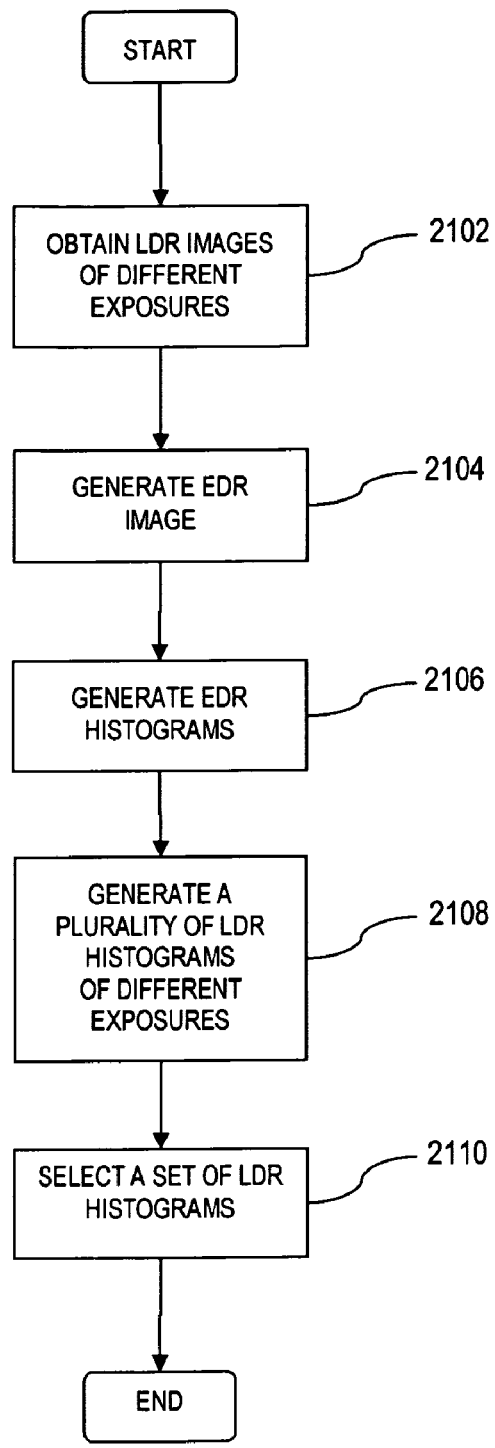
FIG. 21 is a flowchart illustrating the steps for a fifth embodiment of histogram generation unit.

FIG. 21 shows another embodiment which is a slight variation of the second process embodiment. LDR images of varying exposures are obtained in block 2102 and used to generate an EDR image in block 2104. EDR histograms are then calculated in block 2106 using the pixel intensity of the EDR image. A plurality of LDR histograms analogous to different exposure values are then generate from the EDR histogram in block 2108. In block 2110 LDR histograms of a tentative exposure value are then selected. LDR histograms corresponding to a different exposure value can be re-selected if the image corresponding to the tentative exposure value is deemed to be of unsuitable exposure value by the optimum exposure determination unit 210 (see FIG. 2). An LDR histogram having a specific exposure value is defined as the same LDR histogram that will be generated from an image of that specific exposure value.

Figure 22:
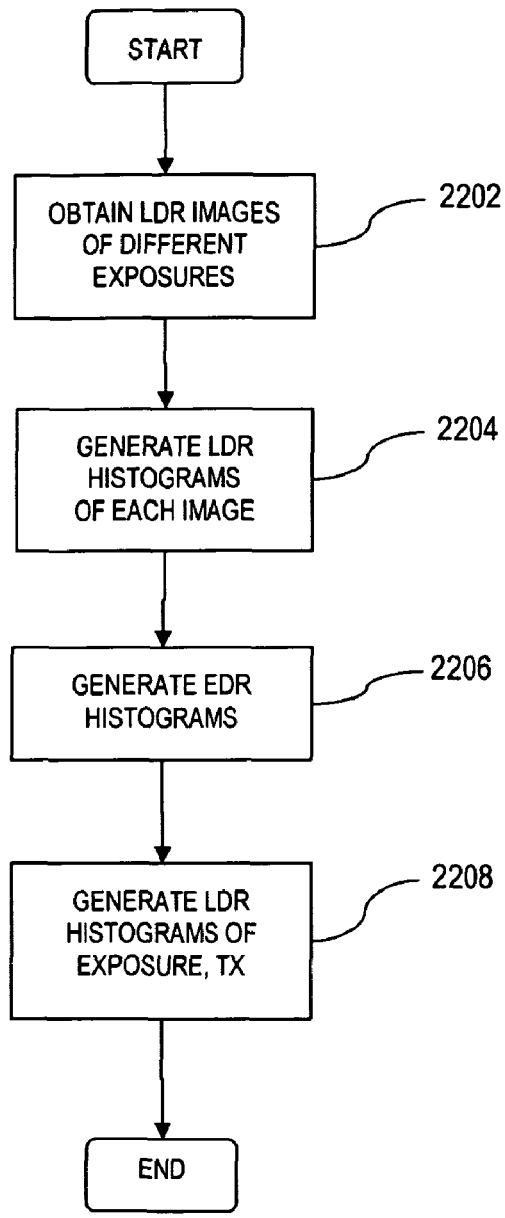
FIG. 22 is a flowchart illustrating the steps for a sixth embodiment of histogram generation unit.

FIG. 22 shows another embodiment. In this embodiment, no EDR image is needed unlike the previous embodiments. In block 2202, a plurality of LDR images of different exposures is obtained. Instead of using them to compose an EDR image, LDR histograms are calculated from each of them in block 2204. From this plurality of LDR histograms, an EDR histogram is then generated in block 2206. The generation of an EDR histogram from a plurality of LDR histograms is similar to the generation of an EDR image from a series of LDR images as described previously in FIGS. 6, 7, and 8. LDR histograms of a tentative exposure value, Tx can be generated from the EDR histogram in block 2210. Tx must be in a predetermined range: the minimum exposure to the maximum exposure value of the plurality of LDR images. A new Tx exposure value can be used if the image of the scene with the current exposure value is deemed to be of unsuitable exposure value by the optimum exposure determination unit 210 (see FIG. 2). An LDR histogram having a specific exposure value is defined as the same LDR histogram that will be generated from an image of that specific exposure value.

Figure 23:
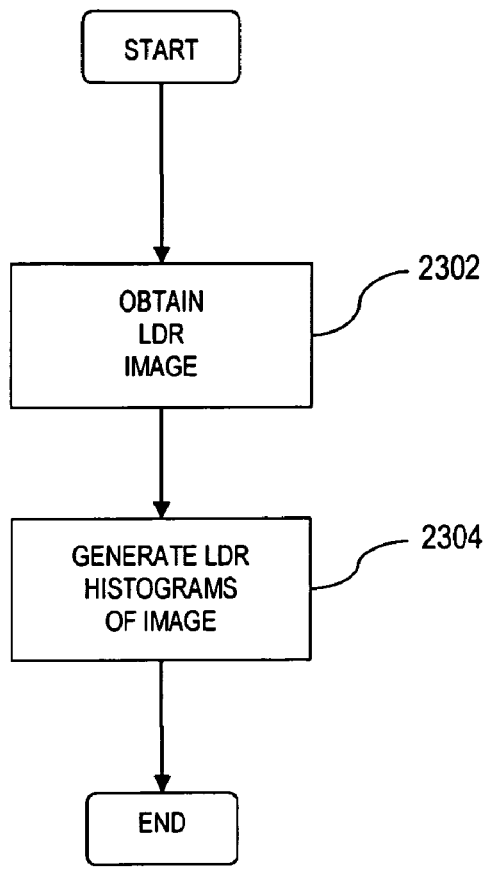
FIG. 23 is a flowchart illustrating the steps for a seventh embodiment of histogram generation unit.

FIG. 23 shows another embodiment, where an LDR image is obtained in block 2302 from the image pickup apparatus 202 (see FIG. 2). LDR histograms are subsequently generated from this image in block 2304. If the optimum exposure determination unit 210 (see FIG. 2) determines the image to be of unsuitable exposure, then another image can be taken from the image pickup apparatus 202 and the steps are repeated.

The histogram generation unit 206 in the imaging system 204 and its various embodiments have been described. The histograms features extraction unit 208 or the features extraction unit 208 for short will be described next.

A typical outdoor daylight picture usually comprises part of the sky, a dominant subject, which is the picture's primary focus, and a bright object that has to be adequately exposed. The subject may or may not be in highlight, depending on its surroundings. The presence of part of the sky in the picture can cause the auto-exposure of an imaging system to underexpose the picture, causing the subject to be too dark. Hence, if the subject is the picture's focus, then there is a need to adequately expose the image even in the presence of the sky. On the other hand, if a bright object is present within the picture, focusing solely on the dominant subject that is not in highlight may increase exposure so much so as to cause the bright object to be washed out. Therefore, there is a need to strike a balance to achieve an exposure for both the dominant subject and the bright object even in the presence of the sky in the picture.

To achieve an adequately exposed image, the imaging system 204 includes a features extraction unit 208, shown in FIG. 2. The features extraction unit identifies the three features essential for an optimally exposed image: the presence of the sky, a dominant subject, and a bright object. These features will be referred to as Sky-Peak, Significant-Peak, and Right-Peak, respectively.

Figure 24:
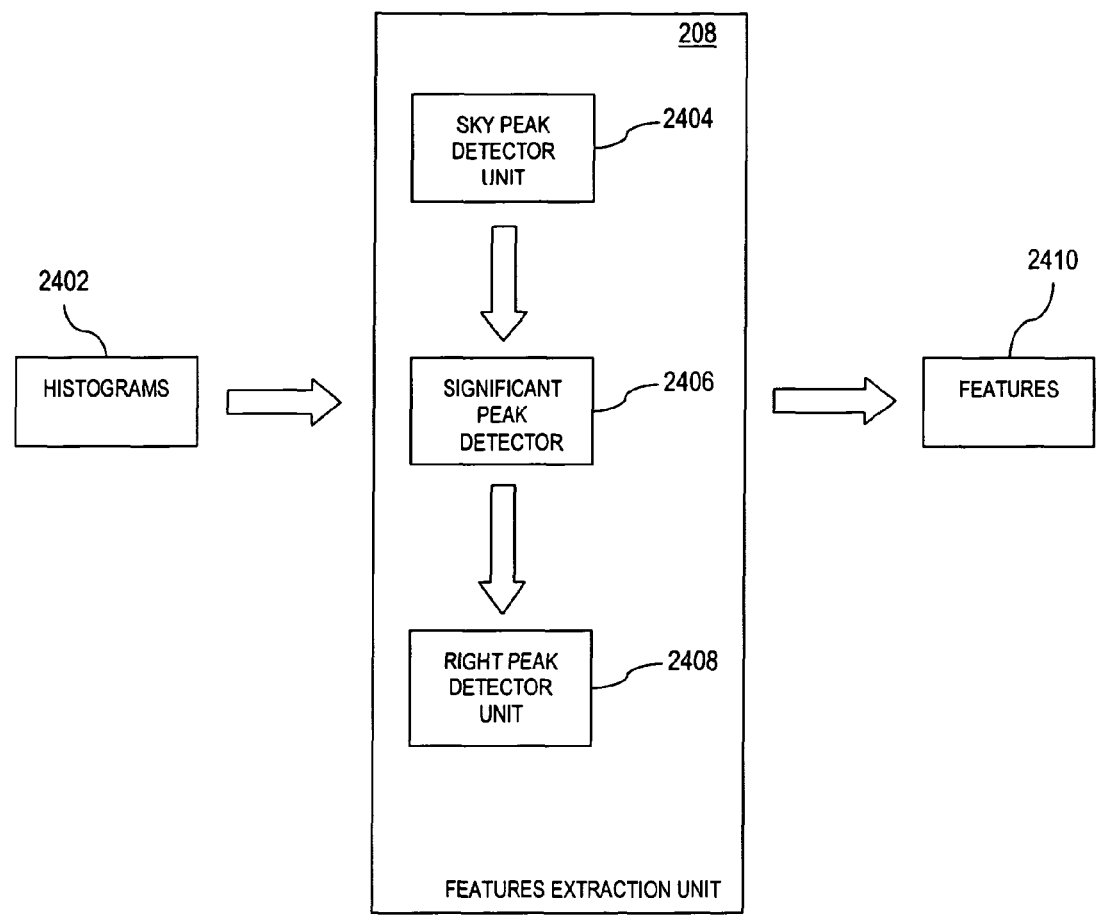
FIG. 24 is an illustration of an embodiment of a features extraction unit.

As shown in FIG. 24, the features extraction unit 208 may include a sky-peak detector unit 2404, a significant-peak detector unit 2406, and a right-peak detector unit 2408, respectively. The various detector units examine the image's histograms and extract specific characteristics.

These key features, Sky-Peak, Significant-Peak and Right-Peak provide a guide for the contents of histograms when an image has an optimum exposure. These three features are meant as a guide and are not restrictive in nature. What comprises a peak in a histogram will be discussed next to understand these features and what they represent in an image.

Figure 25A:
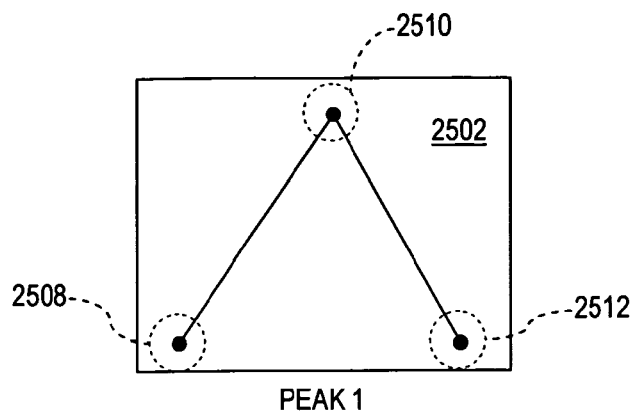
FIGS. 25$a$-$c$ are graphs showing three types of histogram peaks.
Figure 25B:
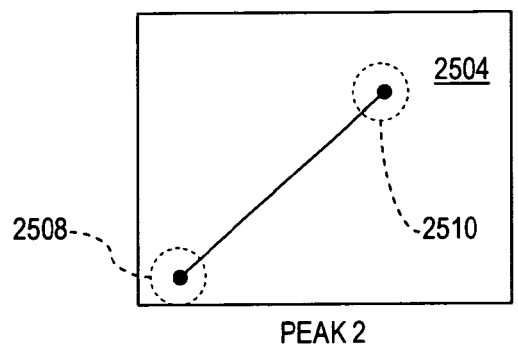
Figure 25C:
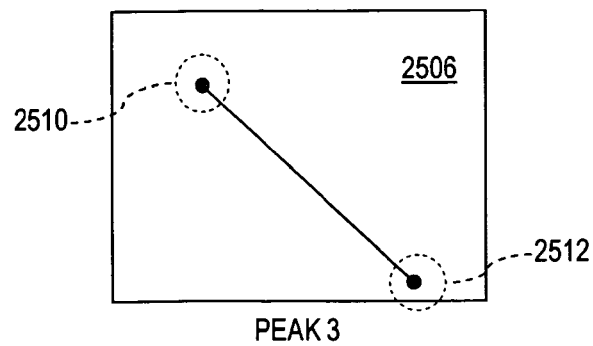

Peaks can be defined as a group of consecutive vertices in a histogram that have only one local maxima. Three different types of peaks that can be found in histograms are shown in FIGS. 25a-c. The first type of peak, Peak 1 2502 is shown in FIG. 25a. FIG. 25a shows a portion of the histogram where a vertex of the portion is flanked on each side by a vertex having a lower y-value. The highest point of the peak is referred to as the summit 2410, while the lowest point to the left of the peak is referred to as the left tail of the peak 2508 and to the right, as the right tail of the peak 2512. FIG. 25b shows a second type of peak that is only found at the rightmost end of the histogram. Peak 2 2504 has a summit 2510 at the last bin. Peak 2504 has no right tail, only a left tail 2508 denoting the lowest point of the peak. Finally Peak 3 2506 is shown in FIG. 25c and is found only at the leftmost end of the histograms. The summit 2510 of Peak 3 is at the first bin of the histogram. Peak 2510 has no left tail but has a right tail 2512 denoting the lowest point of the peak. The left and right tails of a peak must always be less than that of the summit. The vertices to the immediate left and right of the tails must be higher than the tail itself. The vertices to the immediate left and right of the summit must be lower than the summit itself. A common term used in the specifications is the rightmost peak of any histogram. It actually refers to the peak with the rightmost summit within the histogram.

Referring to FIG. 24 the features extraction unit 208 receives histograms 2402 and extracts features within the histograms. The three main detectors 2404, 2406 and 2408 detect and measure the key features 2410 of the histograms and these features will be used in the optimum exposure determination unit 210, by comparing the bin values of the summit of the features to predetermined thresholds.

In outdoor daylight pictures, the presence of sky in part of the picture typically causes the auto-exposure of a typical image device to make the rest of the picture dark. The disclosed exposure control mitigates the influence of the sky region on the exposure control. The disclosed method first identifies the sky region, then subsequently eliminates or assigns a low-weighting factor to the histogram bins associated with pixels within the sky region in exposure control calculations.

The sky region of a daytime picture is usually bright. A first characteristic of sky region is that it is typically made up of the brighter pixels within the image. A second characteristic of the sky region is that it is usually dominated by blue or green hues. If represented by the RGB color space, the sky region is usually dominated by the G value and/or the B value of RGB. In the HSV color space, a peak shows up near the blue region of the hue channel, e.g. approximately 240 degrees with a corresponding high V (brightness). In the YCrCb color space, bright blue is represented by a high positive Cb. Such detection is not limited to the color space, but in this embodiment the RGB color space is used. This pair of characteristics translates to peaking at the far right hand side of the green and blue histograms. A term, Sky-Peak, is given to such an observation and how to determine this will be described in detail below.

Figure 26:
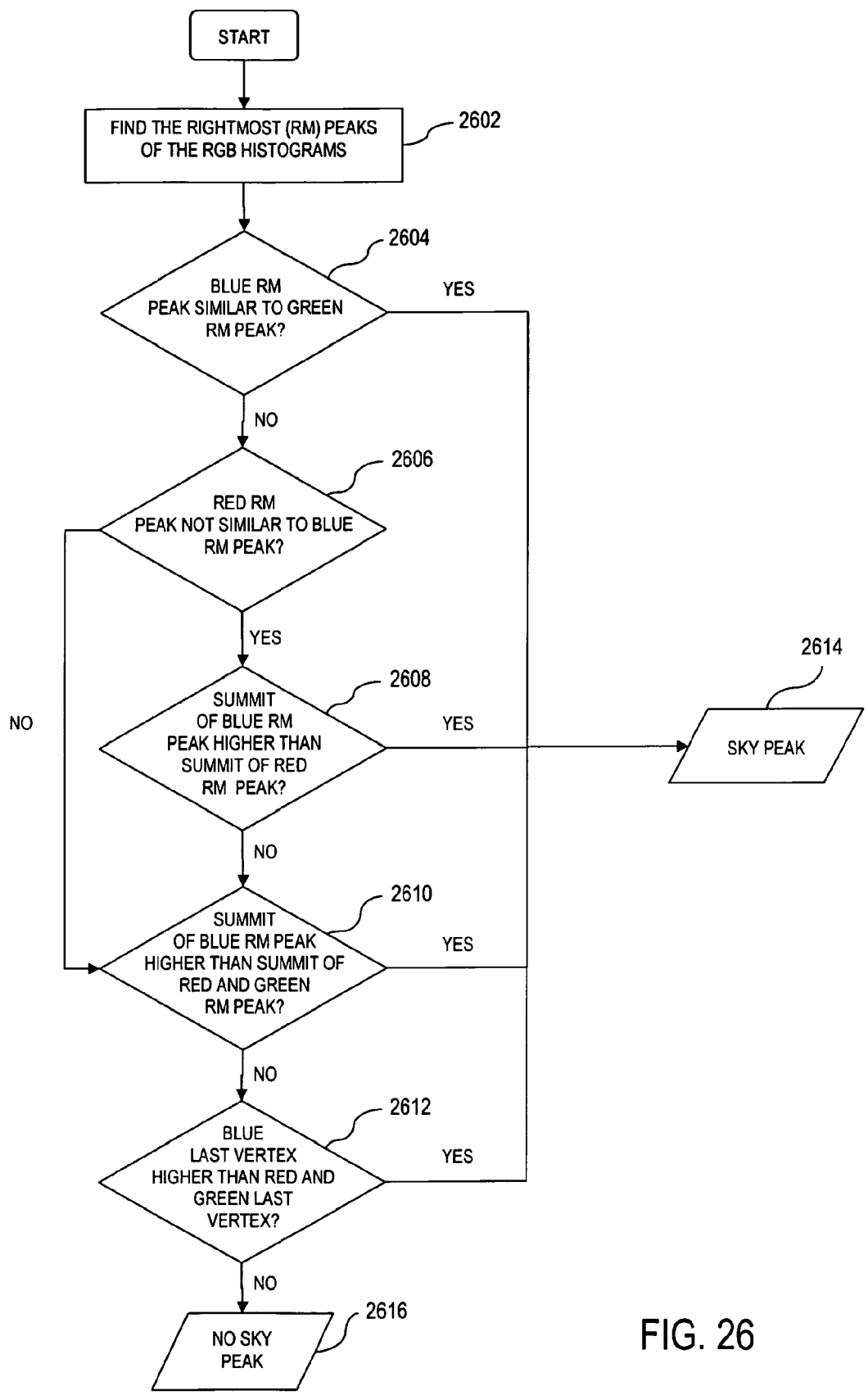
FIG. 26 is a flowchart illustrating the steps for a sky-peak detection unit.

The first component of the features extraction unit 208 is the sky-peak detector unit 2404. FIG. 26 shows a process embodiment of the sky-peak detector unit 2404. The sky-peak detector unit initially finds the rightmost peaks in a set of three channel histograms (Red, Green and Blue) in block 2602. The rightmost peak of the blue histogram will then be compared against the green histogram in decision block 2604 to check if the two peaks are similar to each other. A peak is said to be sufficiently similar to another if the two of its three points: left tail, summit or right tail, are within 1 bin apart. In addition, the population in the similar points should be sufficiently close within a degree of tolerance. For example if peak A's left tail is at bin 3, summit is at bin 5 and right tail is at bin 8 and peak B's left tail is at bin 2, summit at bin 4 and right tail at bin 6, the population at left tail and summit are then checked to see if it is within a tolerable degree such as 10% from each other. If they are, then Peak A is considered similar to Peak B. If the blue rightmost peak is found to be similar to the green rightmost peak, it is concluded that a sky exists in the image with its corresponding Sky-Peak within the histograms in block 2614.

If the blue rightmost peak is found to be not similar to the green rightmost peak, the rightmost peak of the red histogram will then be checked with the rightmost peak of the blue histogram for similarities in decision block 2606. If the red rightmost peak is found to be similar to the blue histogram, the summit of the blue rightmost peak will then be compared against the red one to determine if the blue one is higher in decision block 2608. If the blue one is indeed higher, Sky-Peak exists. However, if either the red rightmost peak is not similar to the blue one or if they are similar but the blue summit is not higher than the red one then another comparison has to be made.

The third comparison checks if the summit of the rightmost peak of the blue histogram is higher than both the summits of the red rightmost peak and the green rightmost peak in decision block 2610. If the blue summit is higher, Sky-Peak exists. Otherwise a fourth comparison has to be made. The sky-peak detector unit will check to determine if the last vertex of the blue histogram is higher than the last vertices of the red and green histograms in decision block 2612. If the red and green last vertices are lower than the blue last vertex, then Sky-Peak exists. However, if all criteria fail, it is concluded that there are no Sky-Peaks in the histograms and consequently no sky in the image in block 2616.

Figure 27A:
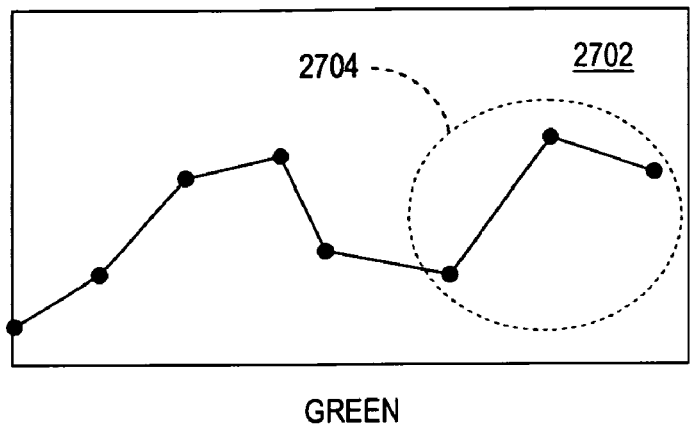
FIGS. 27$a$-$b$ are graphs showing an example of similar rightmost peaks in the histograms of the green and blue channels.
Figure 27B:
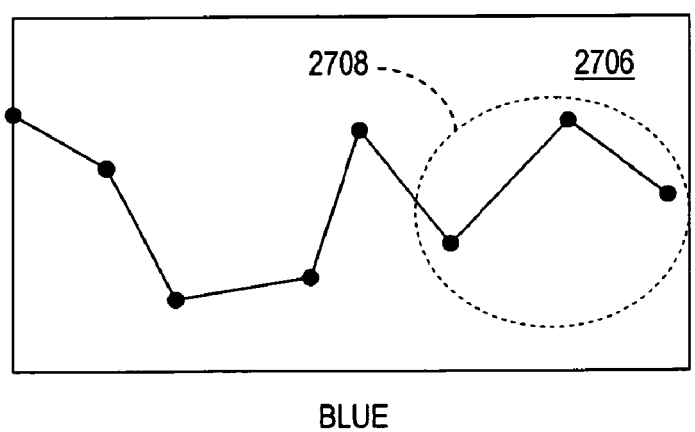

FIGS. 27a-b, 28a-b, 29a-c and 30a-c illustrate criteria used to determine if a Sky-Peak exists. In FIG. 27a and FIG. 27b, the first criterion of the comparison of the blue and green rightmost peak in decision block 2604 of the process shown in FIG. 26 is illustrated. FIG. 27a shows a green histogram 2702 of a particular image while FIG. 27b shows a blue histogram 2706 of the same image. The green and blue rightmost peaks are highlighted using a dashed circle as shown in FIG. 27a as 2704 and in FIG. 27b as 2708, respectively. The rightmost peaks of the two histograms are relatively similar as shown in FIG. 27a and FIG. 27b, which represents the presence of a Sky-Peak.

Figure 28A:
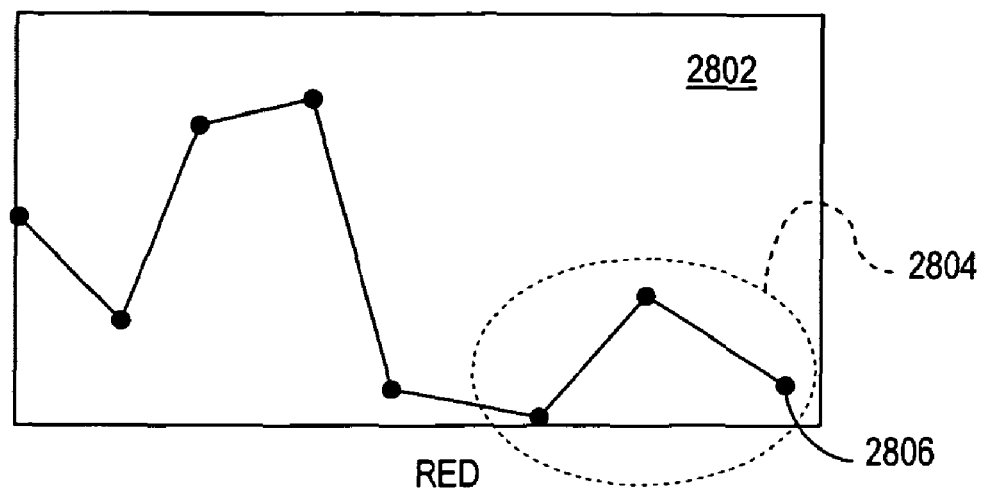
FIGS. 28$a$-$b$ are graphs showing an example of the last vertex of the blue histogram being significantly higher than the red histogram.
Figure 28B:
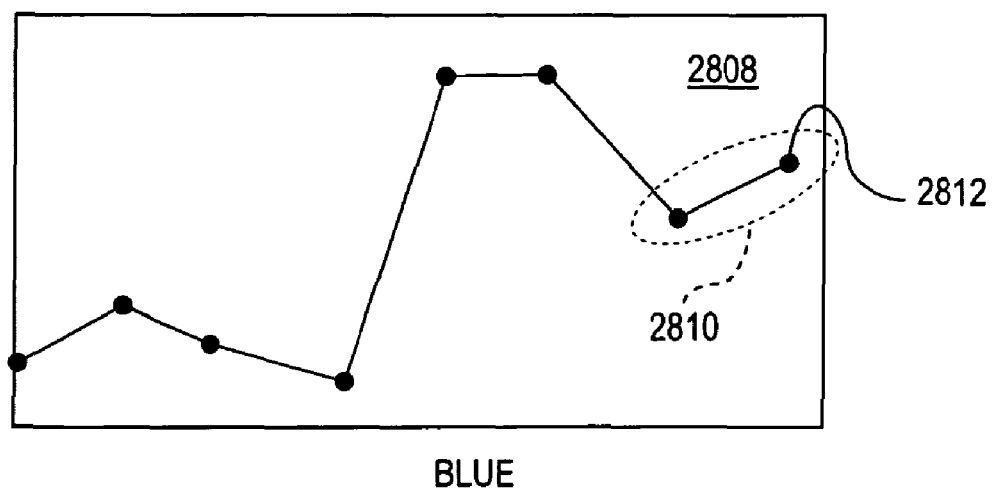

FIG. 28a and FIG. 28b show a red histogram 2802 and a blue histogram 2808 of a particular image, respectively. The rightmost peak of the red histogram 2804 in FIG. 28a is compared against the blue rightmost peak 2810 in FIG. 28b and checked to determine if they are similar. From inspection it can be seen that both peaks are not similar and the blue summit 2812 is much higher than the red summit 2806 of the rightmost peaks of the two histograms which suggest the existence of a Sky-Peak.

Figure 29A:
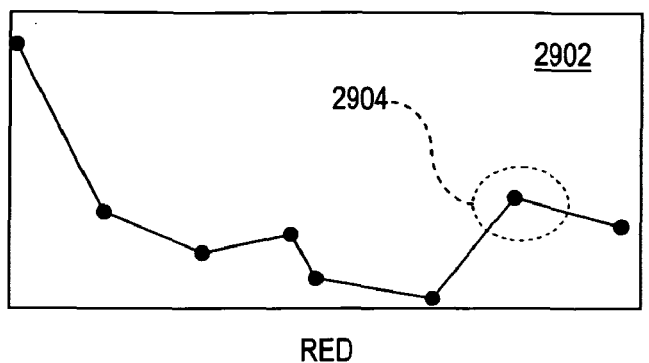
FIGS. 29$a$-$c$ are graphs showing an example of the summit of the rightmost peak of the blue histogram higher than both the red and green histograms.
Figure 29B:
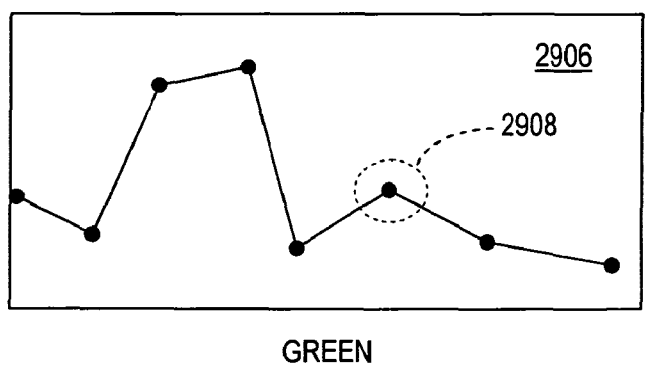
Figure 29C:
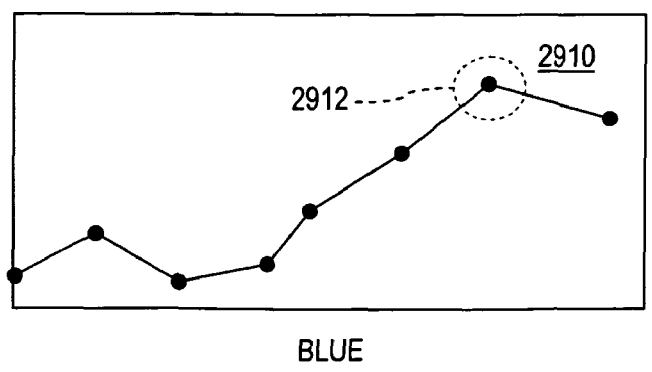

FIG. 29a, FIG. 29b and FIG. 29c shows histograms used in decision block 2610 in the flowchart of FIG. 26. FIG. 29a shows a red histogram 2902 with a rightmost summit 2904, FIG. 29b shows a green histogram 2906 with a rightmost summit 2908, and FIG. 29c shows a blue histogram 2910 with a rightmost summit 2912. From visual inspection it can be seen that the blue summit 2912 is the tallest which suggest the presence of Sky-Peak.

Figure 30A:
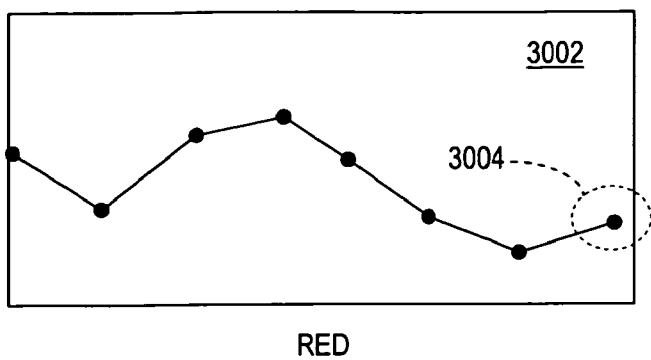
FIGS. 30a-c are graphs showing an example of the last vertex of the blue histogram taller than the last vertexes of the red and green histograms.
Figure 30B:
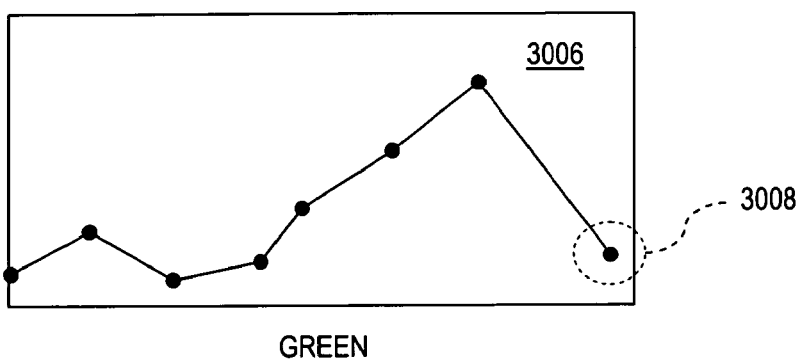
Figure 30C:
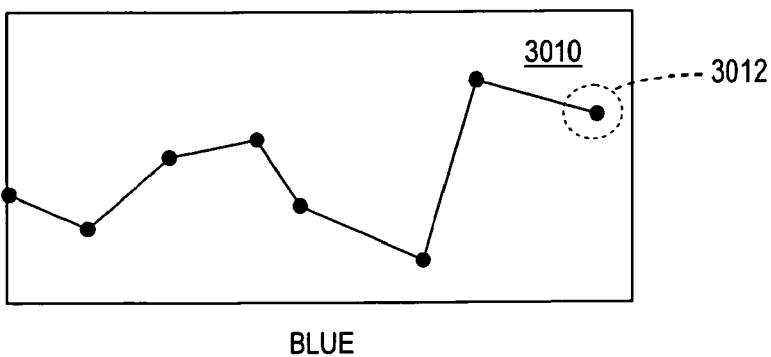

FIGS. 30a-c show the histograms used in decision block 2612 of flowchart in FIG. 26. FIG. 30a, FIG. 30b, and FIG. 30c, show a red histogram 3002 with a last vertex 3004, a green histogram 3006 with a last vertex 3008 and a blue histogram 3010 with a last vertex 3012, respectively. As can be seen, the blue last vertex 3012 is higher than both the red last vertex 3004 and the green last vertex 3008. Therefore, Sky-Peak exists.

Figure 31:
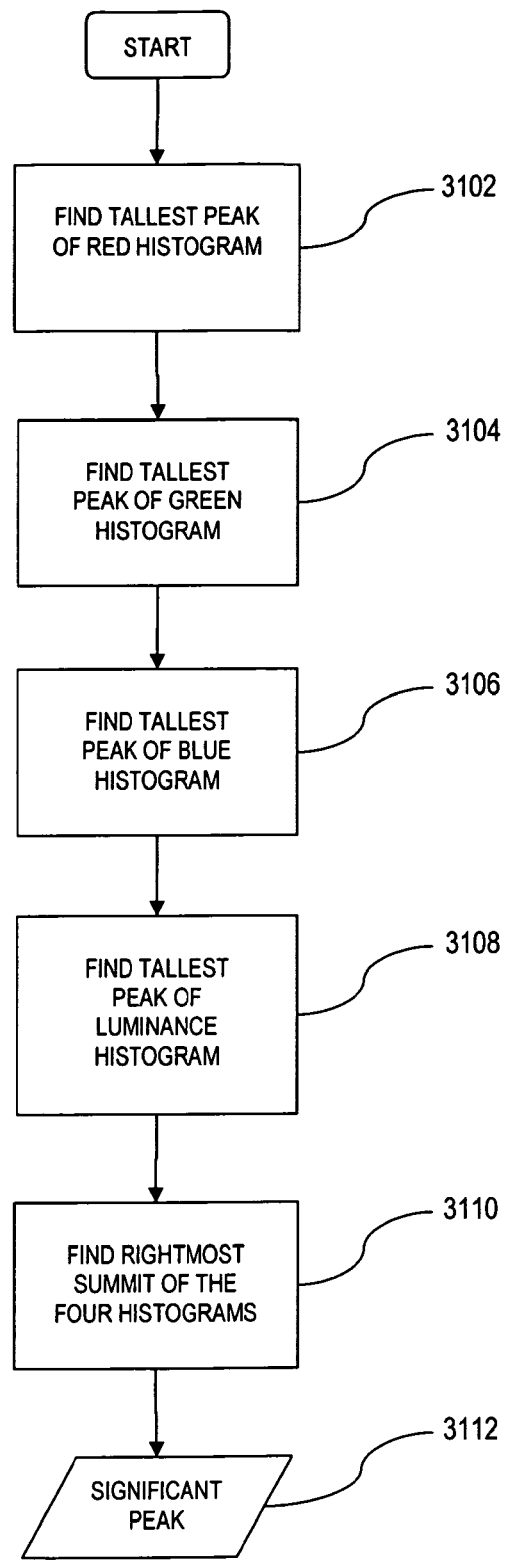
FIG. 31 is a flowchart explaining the measurement of Significant Peak parameter.

The features extraction unit 208 extracts a feature known as Significant-Peak. Significant-Peak represents a dominant subject within an image. For an image to be visually appealing this detail should not be too bright or too dark. This feature can be used to determine if the image is of suitable exposure. FIG. 31 shows a process for detecting a Significant-Peak. The tallest peaks of the histograms of all four channels are first found in blocks 3102, 3104, 3106, and 3108. These peaks must not correspond to the Sky-Peak, and are known as non-Sky-Peak. From these four tallest non-Sky-Peaks from each of the histograms, the peak with the rightmost summit will be selected in block 3110 as a Significant-Peak 3112.

Figure 32:
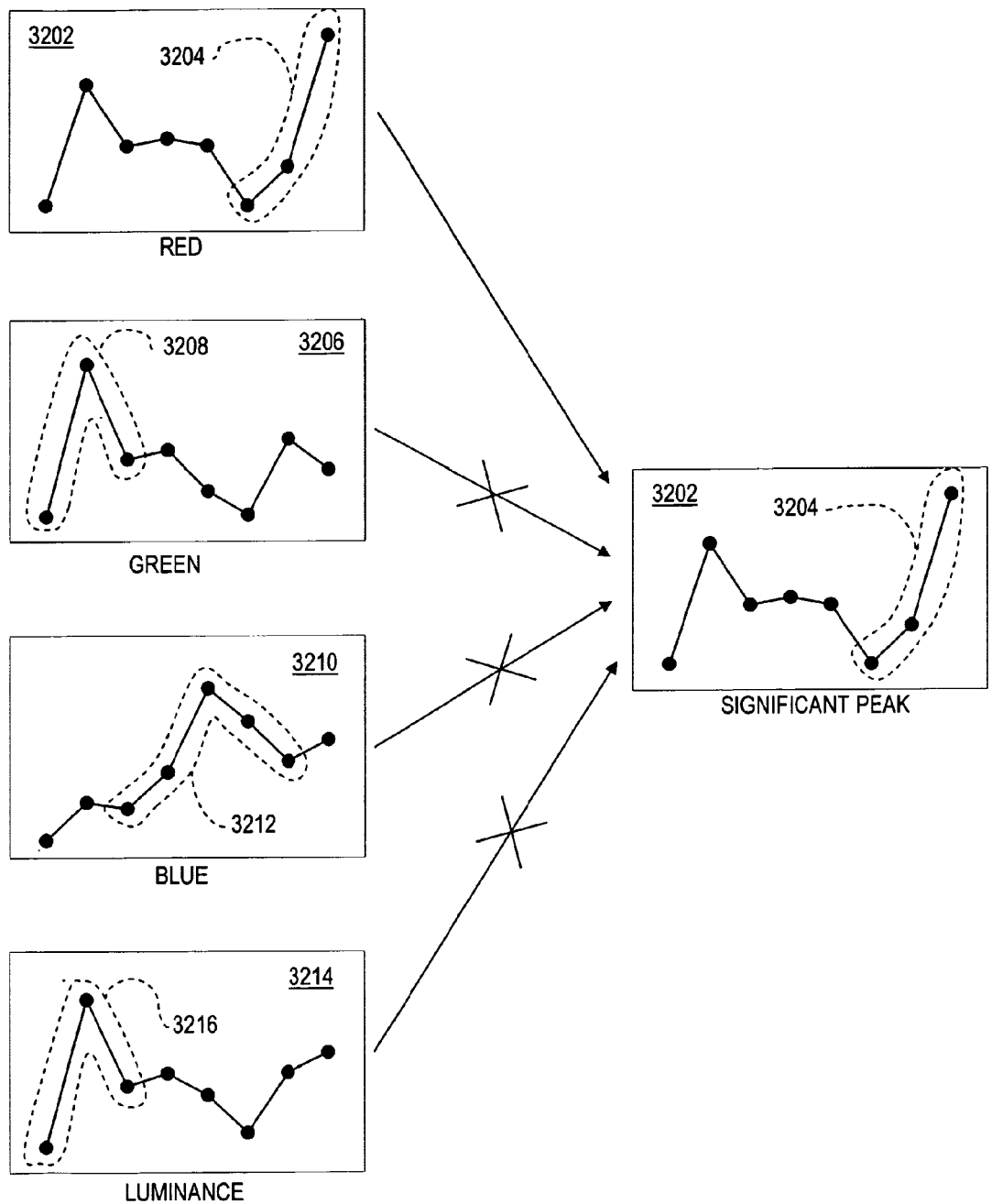
FIG. 32 are graphs that show a pictorial description of the measurement of the Significant Peak parameter.

FIG. 32 provides a graphical example of the detection of Significant-Peak. A red histogram 3202 with its tallest non-Sky-Peak 3204, a green histogram 3206 with its tallest non-Sky-Peak 3208, a blue histogram 3210 with its tallest non-Sky-Peak 3212 and the luminance histogram 3214 with its tallest non-Sky-Peak 3216 are shown. From visual inspection it can be seen that the red summit is at the last bin and is the rightmost summit and the red peak 3204 is thus labeled a Significant-Peak. For example, when an image is underexposed, the subject of the focus is usually dark; thus the bin value of the summit of a Significant-Peak calculated from such a picture may be situated in the darker bins.

Figure 33:
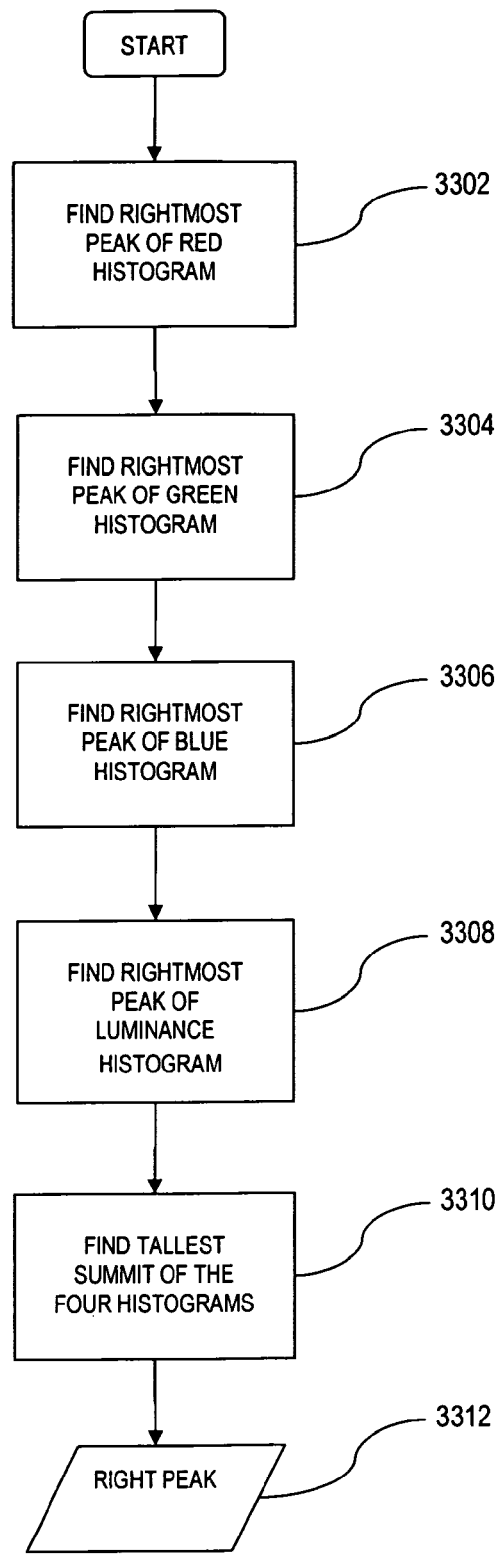
FIG. 33 is a flowchart describing the steps for the measurement of a Right Peak parameter.

The last feature that is to be extracted from the features extraction unit 208 is the Right-Peak. This can be an embodiment to Significant-Peak or used on its own. The Right-Peak represents a bright object within the image. An image with optimum exposure should have this detail neither too bright nor too dark. FIG. 33 shows how the right-peak detector unit measures and detects Right-Peak from the histograms. The rightmost peak that does not correspond to the Sky-Peak is detected in each of the four histograms in blocks 3302, 3304, 3306 and 3308. When all four rightmost non-Sky-Peaks are found, the peak with the tallest summit is determined in block 3310 and labeled a Right-Peak in block 3312.

Figure 34:
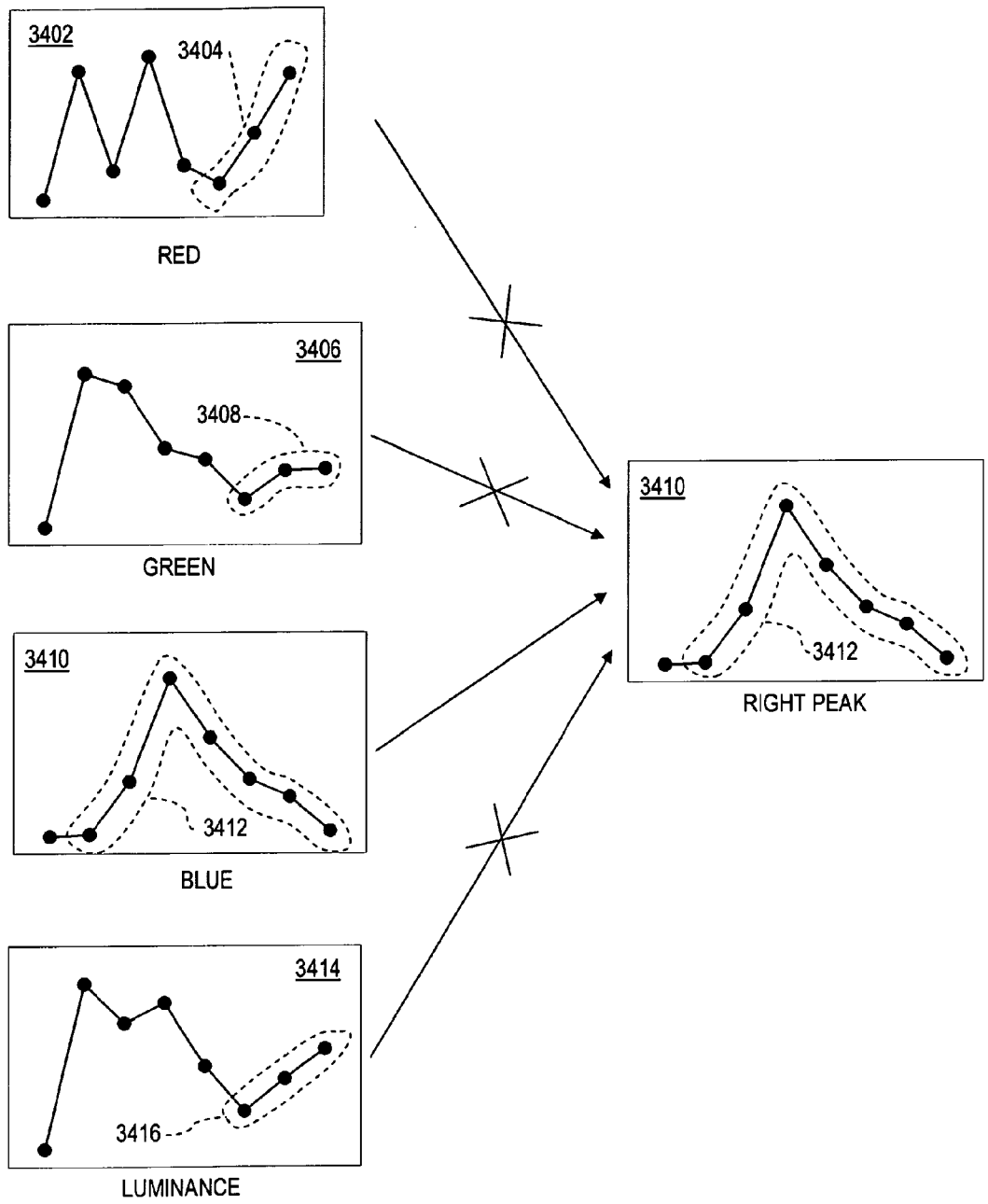
FIG. 34 are graphs that show a pictorial depiction of the measurement of the Right Peak parameter

FIG. 34 is a graphical representation of the process shown in FIG. 33. A red histogram 3402, a green histogram 3406, a blue histogram 3410 and a luminance histogram 3414 of the same image are analyzed as shown on the left hand side of FIG. 34. The rightmost peaks of each histogram that do not correspond to the Sky-Peak are shown as 3404, 3408, 3412 and 3416 of the red, green, blue and luminance histograms, respectively. The blue summit of the peak 3412 is the tallest and is labeled the Right-Peak as shown on the right hand side of FIG. 34. For example, when an image is underexposed, the subject of the focus is usually dark; such that the bin value of the summit of a Right-Peak calculated from such a picture may be situated in the darker bins.

A visually appealing image should not be too dark nor too bright. Also, objects within the image, should have sufficient contrast. If an object is washed out or too dark, there will be hardly any difference between the object and its brightest and darkest point. Furthermore, details within the picture will be lost when suboptimal exposure is applied to the image.

To obtain a desirable picture four criteria can be used to determine if an image has optimum exposure. First, the dark region in the picture should not occupy a large percentage of the entire image. Second, if the picture contains part of the sky, there should be a sufficient contrast between the sky and the rest of the image. Third, the brightest subject or a significant detail within the picture that is not part of the sky should have sufficient contrast between its brightest point and the rest of the object. Last, details of objects in the picture should not be washed out or too dark.

The image can be defined by three types of pixels: dark pixels, mid-range pixels and bright pixels. For example, in an 8-bit RGB image, dark pixels will most likely have RGB values below 50, bright pixels have at least one of RGB values above 200, and the mid-range pixels will be pixels with RGB values that fall in between. The mid-range pixels may overlap with some pixels belonging to the dark pixel range and the bright pixel range. In this embodiment, the three ranges are not strictly exclusive and do overlap. In an optimally exposed image, the sky will consist of mostly bright pixels, while most objects will consist mainly of mid-range pixels with a small proportion of the image made up of dark pixels.

Figure 35:
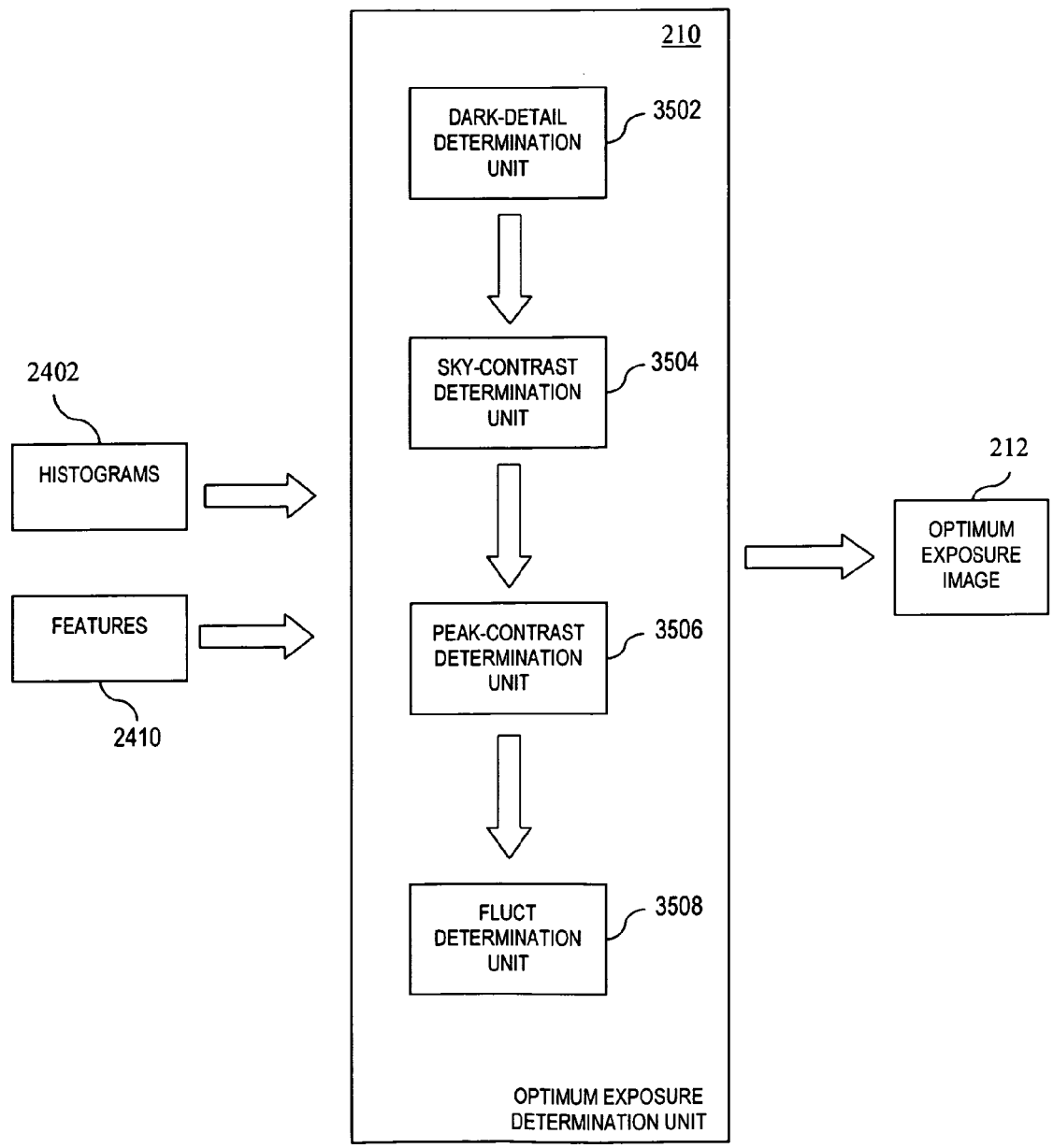
FIG. 35 is an illustration of an optimum exposure determination unit.

FIG. 35 shows an embodiment for an optimum exposure determination unit 210. Histograms 2402 of an image generated from the histogram generation unit 206 or other means, and features extracted from the histograms 2410 from the feature extraction unit 208 or other means, are both provided to determine if the image is of adequate exposure.

The optimum exposure determination unit 210 includes a dark-detail determination unit 3502, a sky contrast determination unit 3504, a peak-contrast determination unit 3506, and a multitude of details detecting unit referred to as a fluct determination unit 3508, which measures the four criteria noted above. All four measurements determine if an image is of suitable exposure, and produce such an image 212.

The criteria will be referred to as the Dark Detail, Sky Contrast, Peak-Contrast and Fluct. The criteria are each first determined and then compared to a predetermined threshold value for optimum exposure determination for histograms of each of the four channels. The measurements used to determine optimum exposure are:
  (a) Dark Detail: Finding the proportion between the dark and collectively the dark and mid-range pixels.
  (b) Sky-Contrast: Examining the contrast between the dark part of the sky and its dominant brightness if a sky exists.
  (c) Peak-Contrast: Finding the contrast between the bright parts of the significant detail and its dominant brightness in the image.
  (d) Fluct: Finding the presence of numerous details within the picture.

Figure 36:
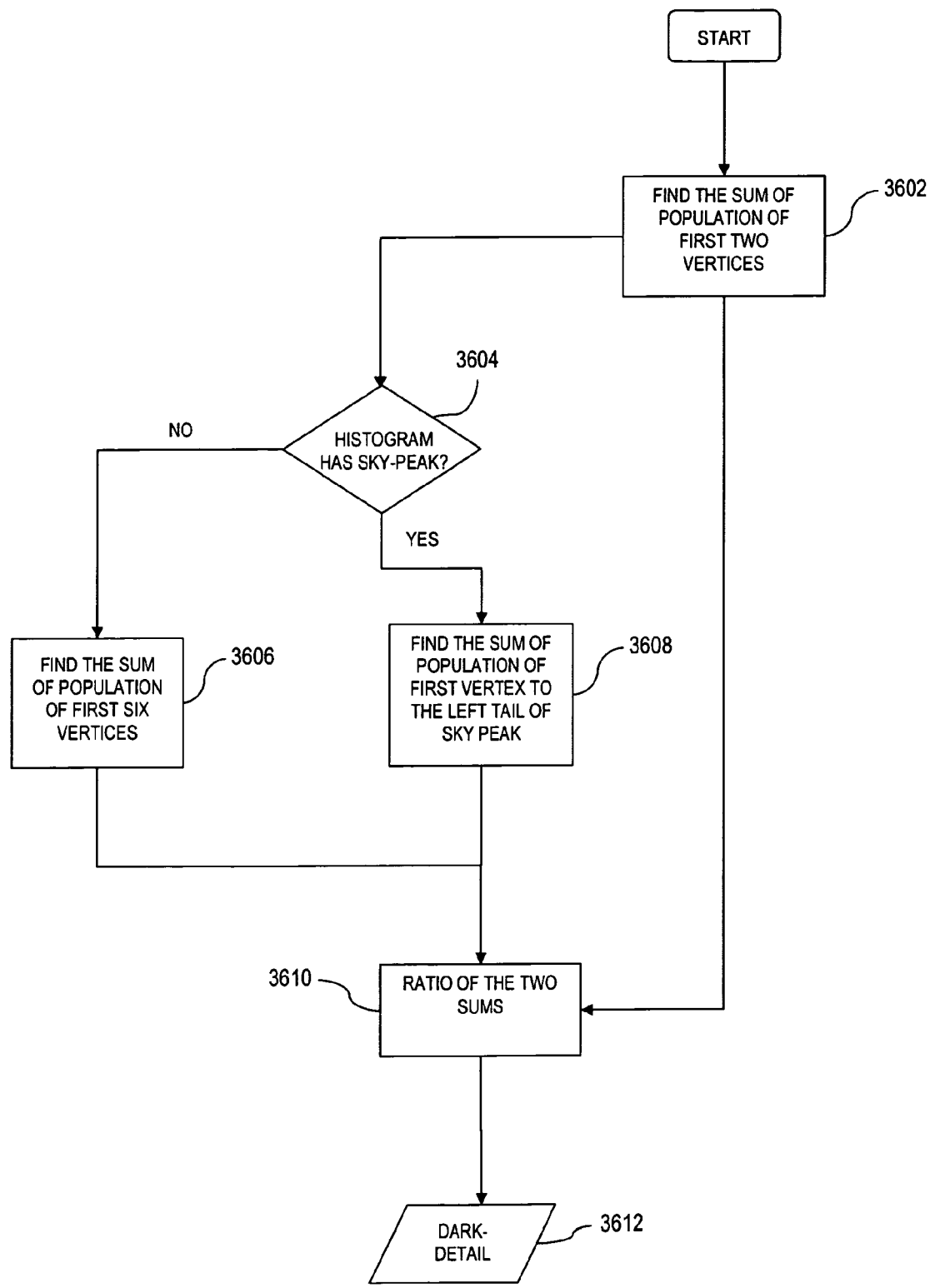
FIG. 36 is a flowchart illustrating a process performed by the optimum exposure determination unit.

Dark Detail measures the proportion between the dark pixels and collectively the dark and mid-range pixels of an image. This proportion is used to determine if the image has suitable contrast. For example, there can be two ways to find Dark Detail, and the choice of the method used depends on the existence of Sky-Peak in the histograms. FIG. 36 shows an example of an 8-bin histogram being processed by a dark detail determination unit 3502. In block 3602 a first sum which calculates the population of the first two vertices of a histogram is found. This constitutes the dark pixels. The histogram is checked to determine the presence of Sky-Peak in decision block 3604. If Sky-Peak is not present, the 8-bin histogram will then be divided into three parts. The first two vertices will be classified as the dark pixels, while the last 2 bins will be the bright pixels. The mid-range pixels will be the second and seventh bins. There is overlapping in the bins between the mid-range pixels and the dark pixels as well as between the mid-range pixels and the bright pixels. Other embodiments where the three parts do not overlap can also be used. The mid-range pixels will be between the third and sixth bins. If Sky-peak is present, it is assumed that the bright pixels will be contained in the bins that represent the Sky-peak, while the first two vertices will still be assumed as the dark pixels. Mid-range pixels will be contained in the bin in between dark and bright pixels. In this embodiment, mid-range pixels will be contained in the bin between dark and bright pixels, including the last bin of the dark pixels and the first bin of the Sky-Peak. Other embodiments, the mid-range pixels that do not overlap with the Sky-Peak can also be used.

To find the first criterion, Dark-Detail 3612, the ratio of the number of dark pixels to that of both the dark and mid-range pixels are found. In the absence of Sky-peak, this is done by taking the ratio 3610 of sum of the population of the first two vertices performed in step 3602 versus the sum of the population of the first sixth vertices determined in step 3606. On the other hand, in the presence of Sky-peak, the upper bound of the mid-range pixels will shift from the sixth bin to the left tail of the Sky-Peak in step 3608.

Figure 37A:
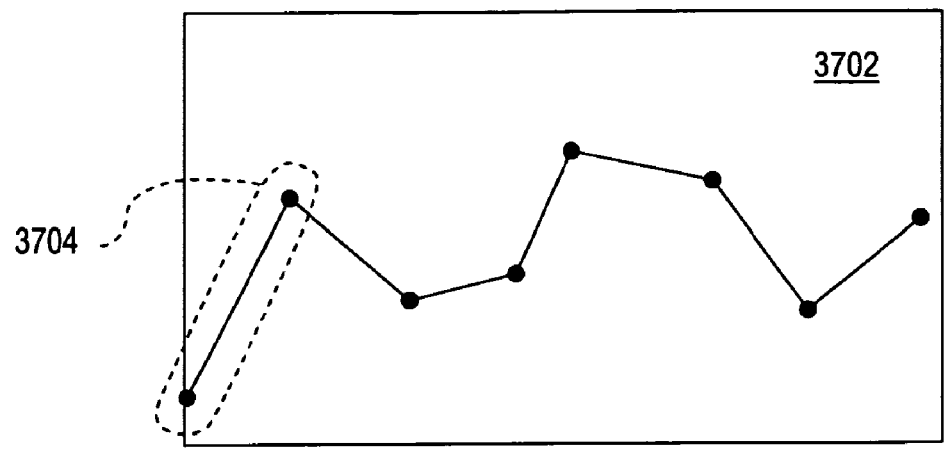
FIGS. 37a-b are graphs that show a first example of a Dark Detail measurement.
Figure 37B:
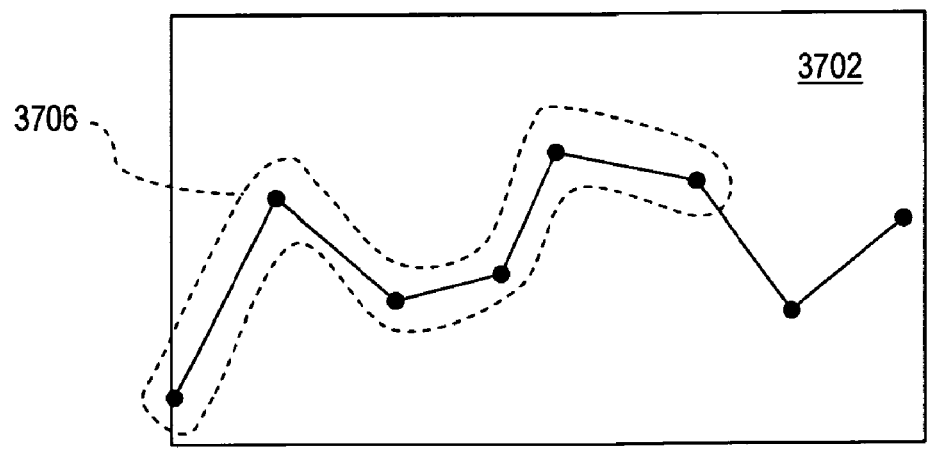

FIG. 37a and FIG. 37b show a histogram 3702 where there is no Sky-Peak present. A first sum of the population of the first two vertices 3704 of an 8-bin histogram is found in FIG. 37a which corresponds to block 3602 of the flowchart in FIG. 36. A second sum of the population of the first six vertices 3606 is then calculated as shown in FIG. 37b, per process block 3606 of FIG. 36. The ratio of the first sum 3704 to second sum 3706 represents Dark Detail, the contrast between the dark and all pixels of the image excluding the bright pixels.

Figure 38A:
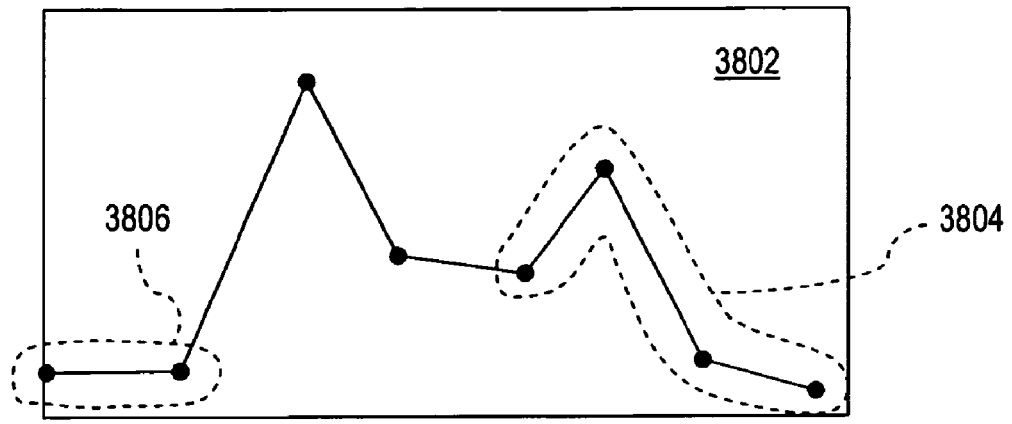
FIGS. 38a-b are graphs that show a second example of a Dark Detail measurement.
Figure 38B:
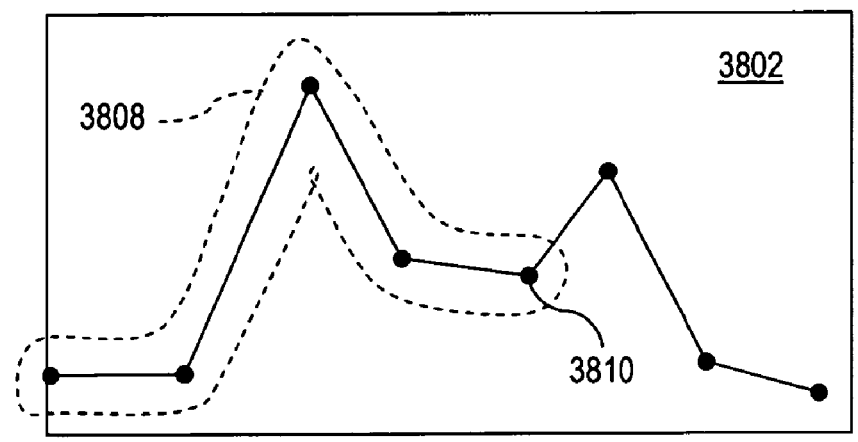

FIG. 38a and FIG. 38b show a histogram 3802 with a Sky-Peak 3804. A first sum 3806 of the y-values of the first two vertices are calculated 3806. However, the second sum 3808 in this method sums up the population of the first vertex to the left tail of the Sky-Peak 3810 as shown in FIG. 38b, per process block 3608 of FIG. 36. Dark Detail is determined by finding the ratio of the first sum 3806 to the second sum 3808. Dark Detail is compared to a threshold value to determine if the exposure of the image being measured is adequate.

Figure 39:
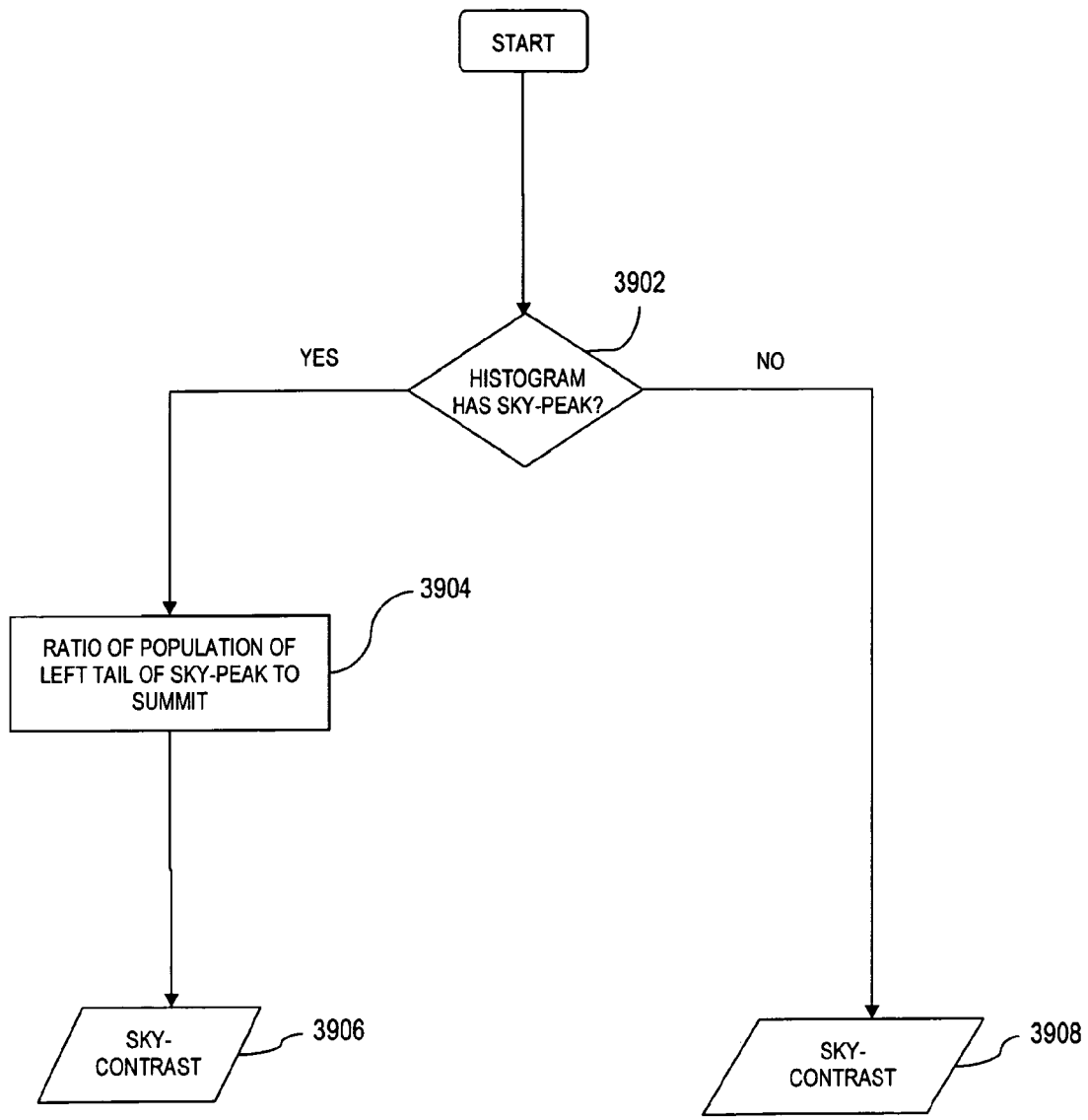
FIG. 39 is a flowchart detailing the measurement of Sky Contrast.

Sky-Contrast measures the contrast between the dark part of the sky and its dominant brightness if a sky exists. Sky-Contrast measures whether details are lost when exposure increases. It is defined as the ratio of the left tail of the Sky-Peak to the summit, where the left tail represent the dark parts of the sky and the summit represent the bin values of the pixels with dominant brightness of the sky. FIG. 39 shows a process performed by the sky-contrast determination unit 3504 to measure Sky Contrast. The histogram is first checked to determine if it has Sky-Peak in decision block 3902. If Sky-Peak is present, then the ratio of the y-value of the left tail of the Sky-Peak to the y-value of the summit is calculated in block 3904. This ratio is provided as a Sky-Contrast measurement in block 3906. However if there is no Sky-Peak then the Sky-Contrast cannot be determined as indicated by block 3908.

Figure 40A:
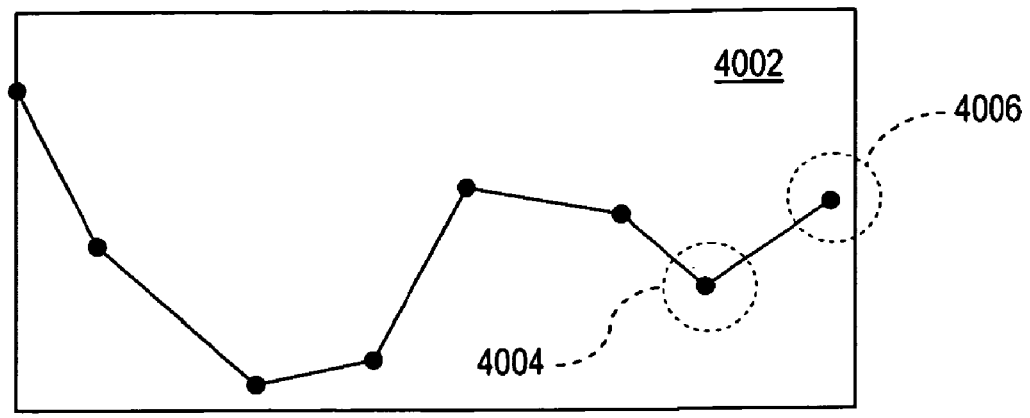
FIGS. 40a-b are graphs that show an example of a Sky Contrast measurement.
Figure 40B:
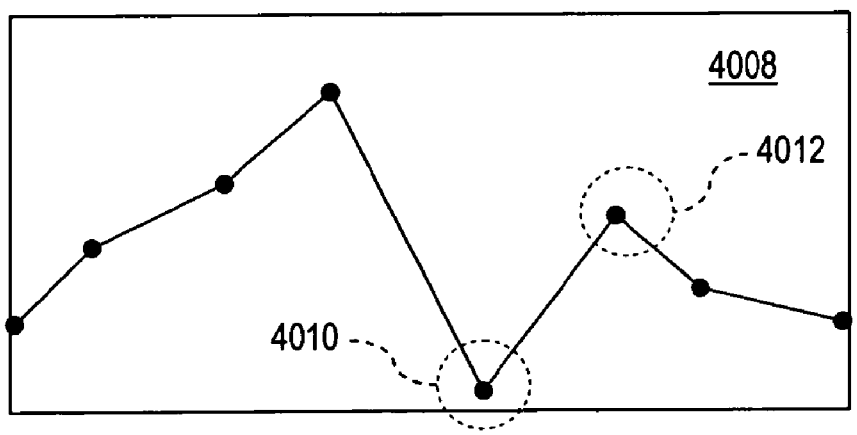

FIG. 40a and FIG. 40b show two histograms of two different images that each contains a Sky-Peak. FIG. 40a shows a histogram 4002 which has a Sky-Peak with a summit 4006 at the last vertex and a left tail 4004. While FIG. 40b shows a histogram 4008 which has a Sky-Peak with a summit 4008 and a left tail 4010. Sky-Contrast of each of the two histograms is the ratio of 4004 to 4006 and 4010 to 4012, respectively. To determine if the current image is of suitable exposure, Sky Contrast must be below a certain threshold value.

Figure 41:
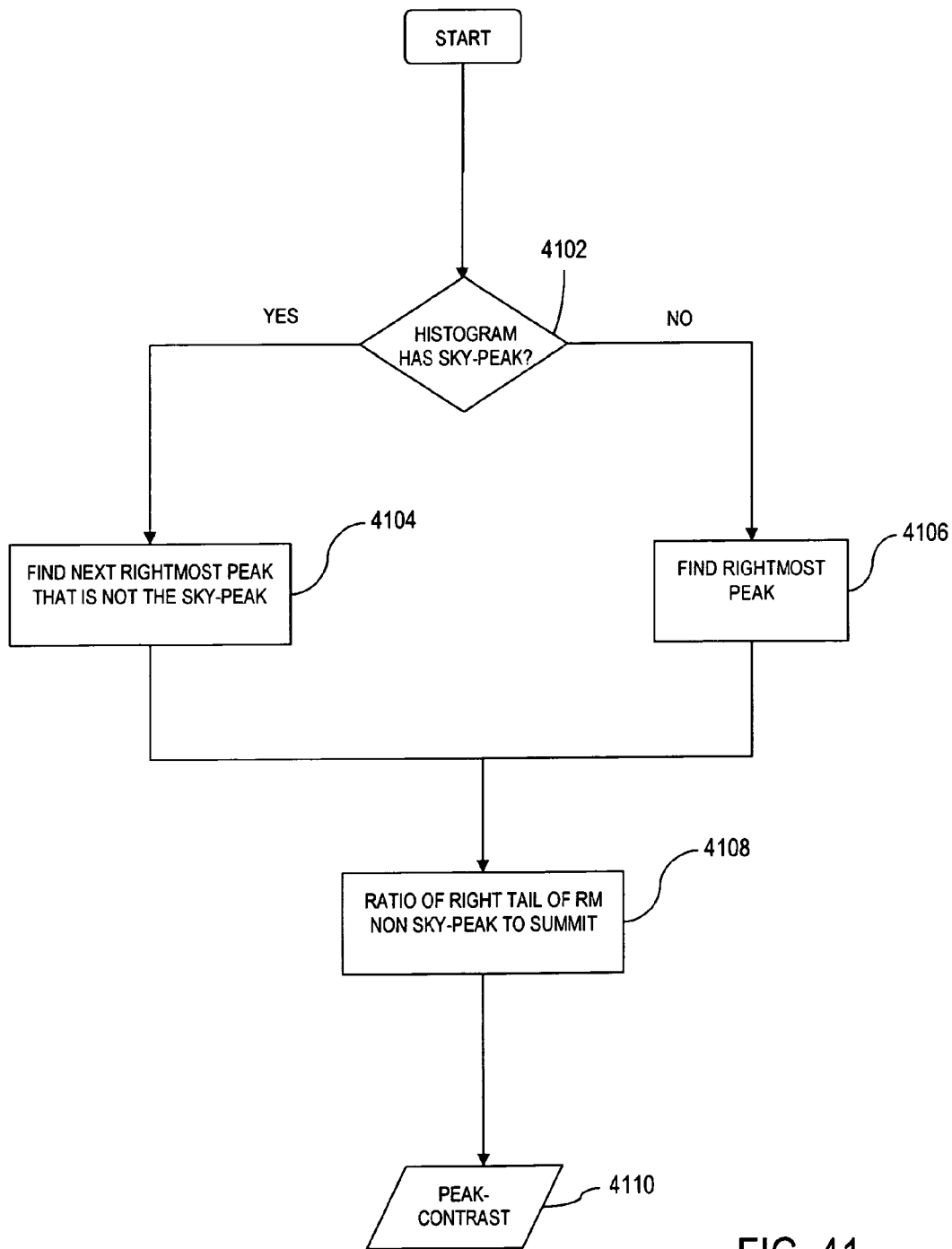
FIG. 41 is a flowchart detailing the measurement of a Contrast Peak.

Peak-Contrast determines the contrast between the bright parts of a significant detail and its dominant brightness in the image. It is used for optimum exposure measurement to insure the significant details within an image do not get washed out as exposure increases. FIG. 41 shows a process to determine Peak-Contrast. The histogram is checked to determine if it contains a Sky-Peak in decision block 4102. If it does, the next rightmost peak that does not correspond to the Sky-Peak otherwise known as a non-Sky-Peak is found in block 4104. Otherwise if there is no Sky-Peak, the rightmost peak of the histogram is found in block 4106. Next, the ratio of the population of the right tail of the rightmost non-Sky-Peak found in either 4104 or 4106 to the population of its summit is calculated in block 4108, and this is the measurement is provided as a Peak-Contrast in block 4110.

Figure 42A:
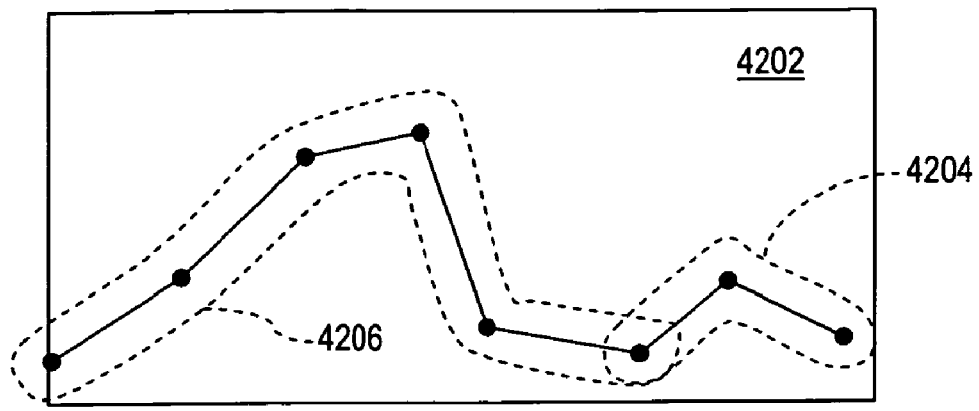
FIGS. 42a-b are graphs that show a first example of a Contrast Peak measurement.
Figure 42B:
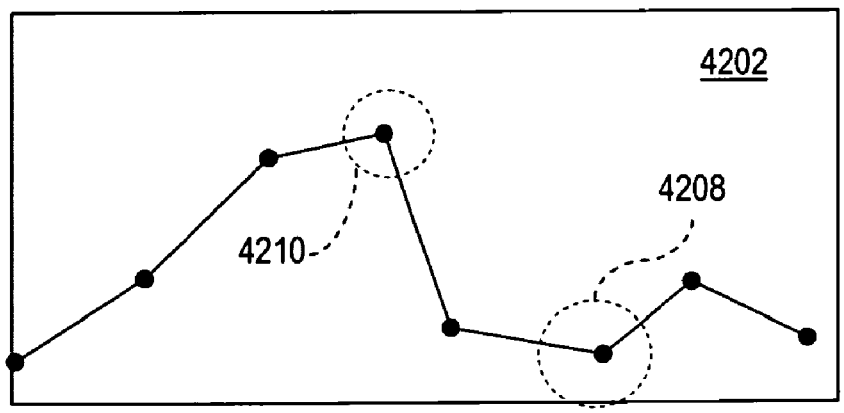
Figure 43A:
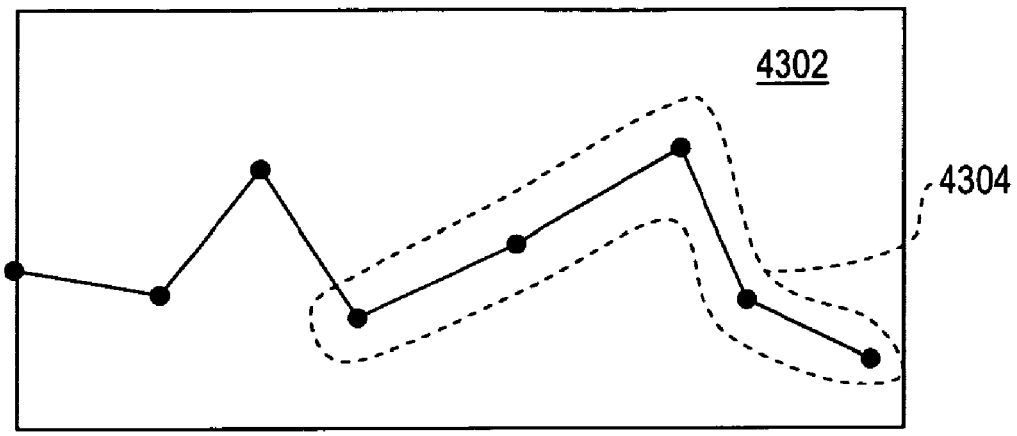
FIGS. 43a-b are graphs that show a second example of a Contrast Peak measurement.
Figure 43B:
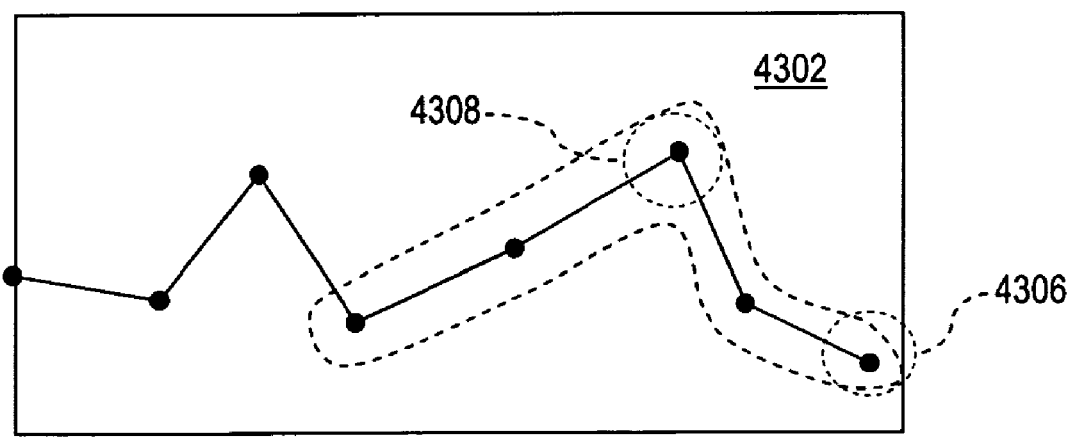
Figure 44:
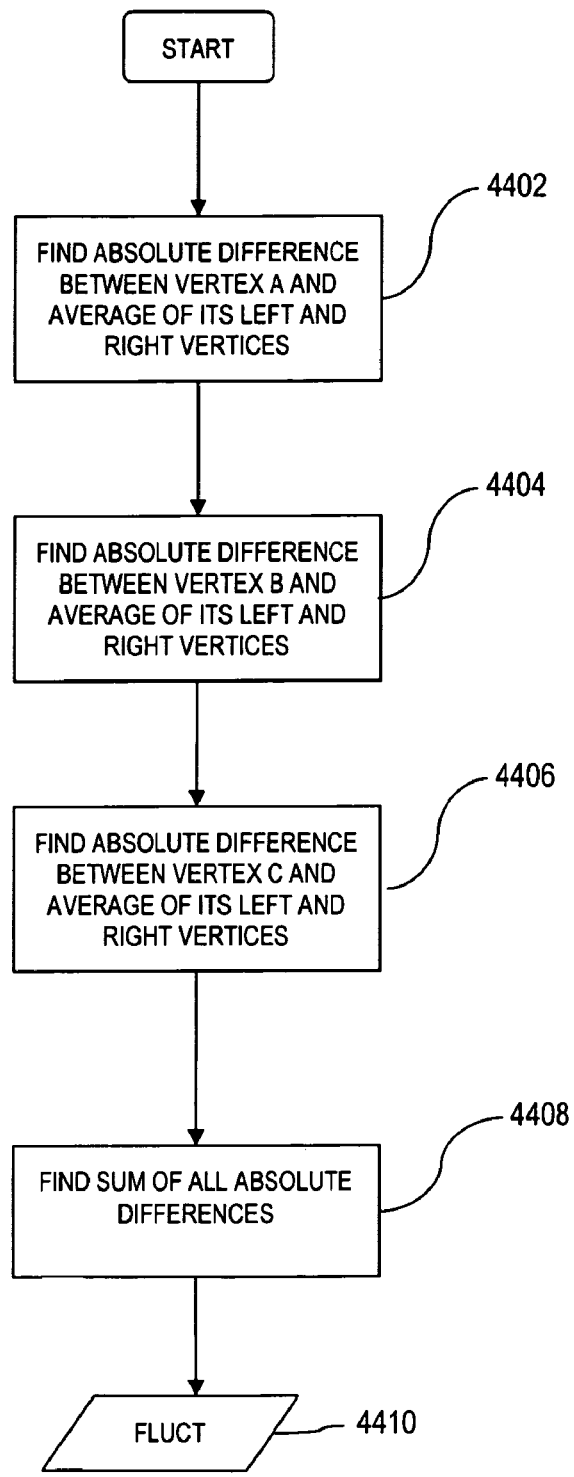
FIG. 44 is a flowchart detailing the measurement of Fluct.

FIGS. 42a-b and 43a-b illustrate a determination of Peak-Contrast. In FIG. 42a and FIG. 42b, the histogram 4202 is checked for a Sky-Peak. A Sky-Peak is found to be present 4204 and the next rightmost non-Sky-Peak 4206 is found. The Peak-Contrast is then found by taking the ratio of the population of the right tail of the rightmost non-Sky-Peak 4208 to the population of the summit 4210. In the second histogram 4302 shown in FIGS. 43a and 43b, there is no presence of Sky-Peak. The rightmost peak 4304 is found. The Peak-Contrast is the ratio of the population of the right tail of the peak 4304 to the population of the summit 4308. The Peak-Contrast must be less than a certain threshold in order for the current image being determined to be of adequate exposure Finally, the last measurement Fluct is needed to determine whether the exposure is adequate for a particular image. It measures the presence of numerous details within the picture which are represented in the histograms as fluctuations or non-smoothness. Numerous details within a picture have to be kept within a certain optimum exposure. If the number of details is too small, exposure may not be adequate. FIG. 44 shows a process for Fluct analysis. The absolute difference between the population of a chosen vertex, Vertex A, and the average of its immediate left and right vertices are found in block 4402. This is repeated in blocks 4404 and 4406 by changing the vertex in question (Vertex A). In this example the absolute difference for three vertices are found but any number of vertices can be used depending on the size of the bins and other factors. The sum of all the absolute differences are then found in block 4408, and this is provided as Fluct in block 4410.

Figure 45A:
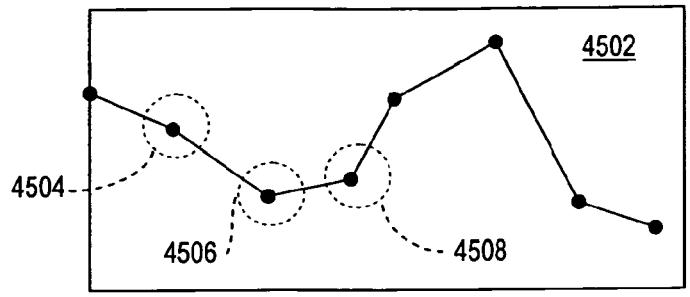
FIGS. 45a-d are graphs that show an example of a Fluct measurement.

For example, Fluct can be calculated as the sum of all the absolute differences between a vertex and the average of its immediate left and right vertex, for a series of consecutive vertices as shown in FIGS. 45a-d. FIGS. 45a-d show a histogram 4502 with 8-bins. FIG. 45a shows Fluct1, which is the absolute difference between the y-value of vertex 3 4506 and the average y-values of vertex 2 4504 and vertex 4 4508.

Figure 45B:
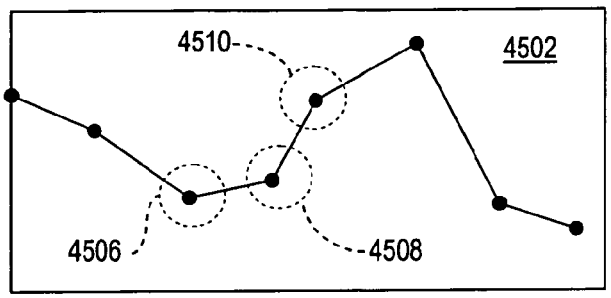
Figure 45C:
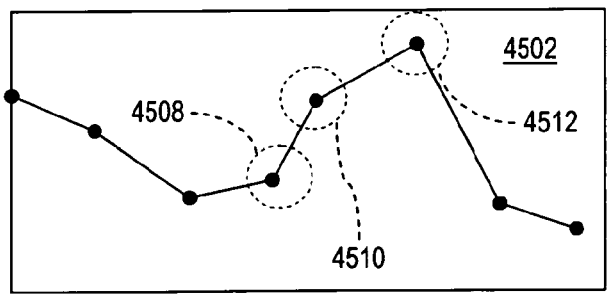
Figure 45D:
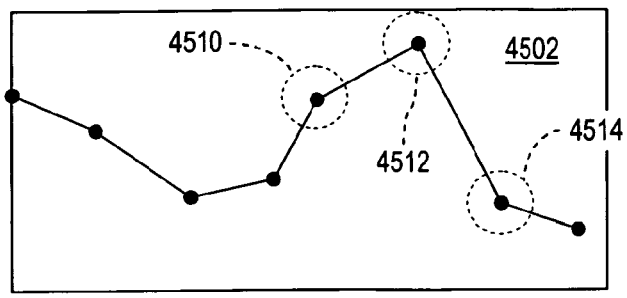

Fluct2 is the absolute difference between the population of vertex 4 4508 and the average of vertex 3 4506 and vertex 5 4510 and is shown in FIG. 45*b*. Fluct3 shown in FIG. 45*c* is the absolute difference between the y-value of vertex 5 4510 and the average of vertex 4 4508 and vertex 6 4512. In FIG. 45*d*, Fluct4 is the absolute difference in y-values between vertex 6 4512 and the average of vertex 5 4510 and vertex 7 4514. Fluct is then the sum of Fluct1, Fluct2, Fluct3, and Fluct4. Fluct must be above a certain threshold in order to determine the presence of numerous details within the picture, and hence the adequacy of exposure. This is one example of calculating the measurement Fluct. Other formulas may be proposed to calculate Fluct as long as it indicates ripples in the histogram curve.

The formula stated above can be expressed as:

$$\sum_i \left\| \left( \frac{(Y_{i-1} + Y_{i+1})}{2} - Y_i \right) \right\|.$$

Other formulas that may be proposed includes:

$$\sqrt{\left( \sum_i^n (Y_i - Y_{i-1})^2 \right)}$$

$$\sqrt{\left( \sum_i^n \left( Y_i - \frac{Y_{i-1}}{2} - \frac{Y_{i+1}}{2} \right)^2 \right)}$$

Apart from the four parameters, Dark Detail, Sky-Contrast, Peak-Contrast and Fluct, as mentioned above, features extracted from the histograms can also be used to determine the optimality of exposure. These features as mentioned in the embodiment of the feature extraction unit 208 are the Sky-Peak, Significant-Peak and Right-Peak. The properties of these three features are compared against predetermined threshold values to check if the image is of optimum exposure.

Given these parameter and features, a slew of criteria can be used to determine if exposure is sub-optimal. These criteria compare the features and parameters with pre-determined threshold values. These threshold values were experimentally found to give the best results with regards to the features and parameters. The parameters are usually measured in terms of fractions or percentages except for Fluct, which measures a non-smoothness in the histogram and features are used to find the parameters. If Dark-Detail is greater than half, this means that the dark pixels occupy more than half of the image and the image is deemed too dark, and exposure is sub-optimal. If Sky-Contrast is greater than 50%, there is a lack in contrast between the darkest part of the sky with the entire sky, which means that details of the image are lost due to overexposure. Another sign of overexposure is when Peak-Contrast measures more than 50%.

On the other hand, exposure may be near optimal when there is a balanced ratio for bright and dark pixels. This is achieved when Sky-Contrast is around a fifth while Dark-Detail is around a third. Furthermore, exposure may be optimal when multiple details appear, which is indicated by a high Fluct. The summit of Significant-Peak and Right-Peak will also be at the upper half of the histogram and Dark-Detail is less than a fifth when exposure is near optimal.

The threshold values for the bin value for the summit of Significant-Peak or Right-Peak can vary between lower bin values to higher bin values depending on whether the test is for an underexposed or overexposed image. Threshold values for Dark-Detail typically has values less than 70% for an optimally exposed image while that for Sky-Contrast varies between 5% to 60% depending on the whether the test is for under or overexposure and with what other parameters Sky-contrast is paired with. Threshold values for Fluct usually has high values when multiple details appear and these values are above 200 and threshold values for Peak-Contrast is usually around 50%.

Figure 46:
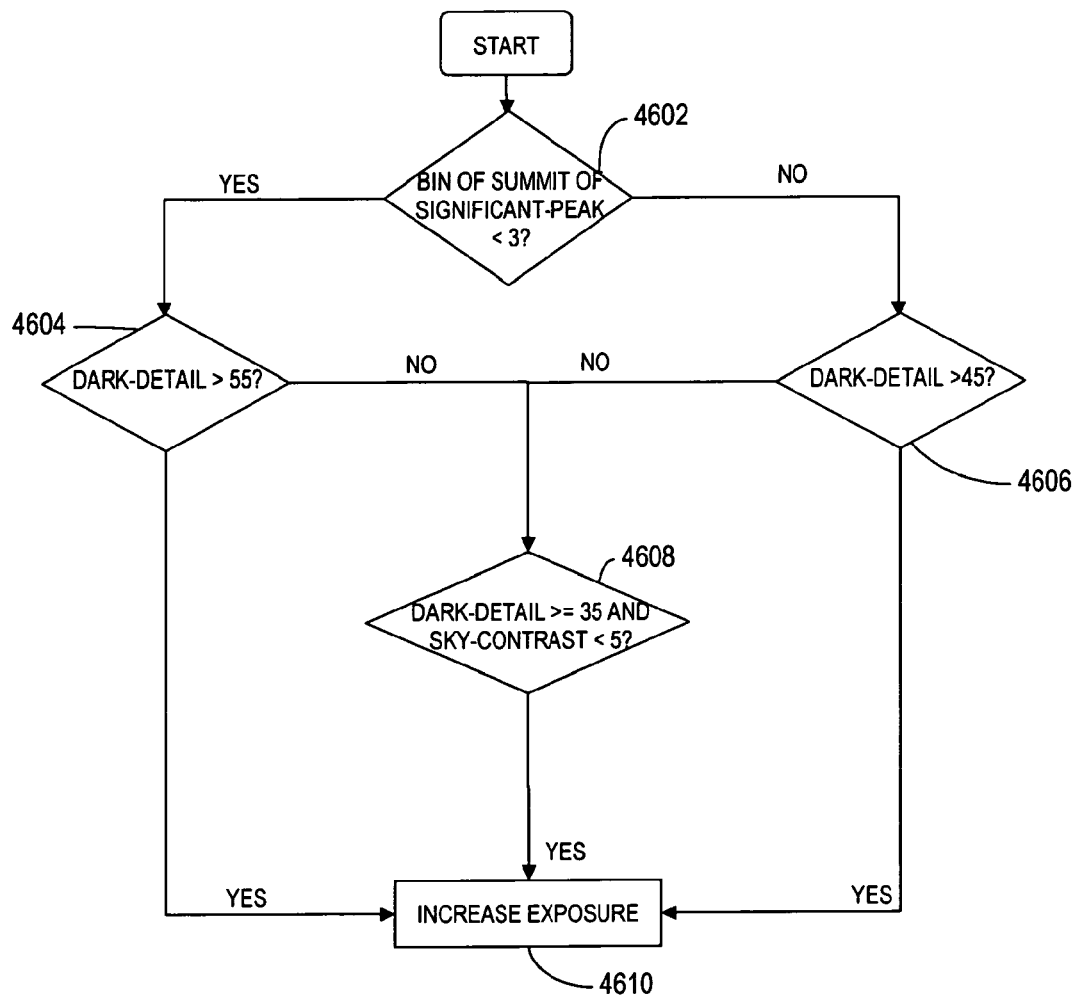
FIG. 46 is a flowchart showing a process to increase exposure.
Figure 47:
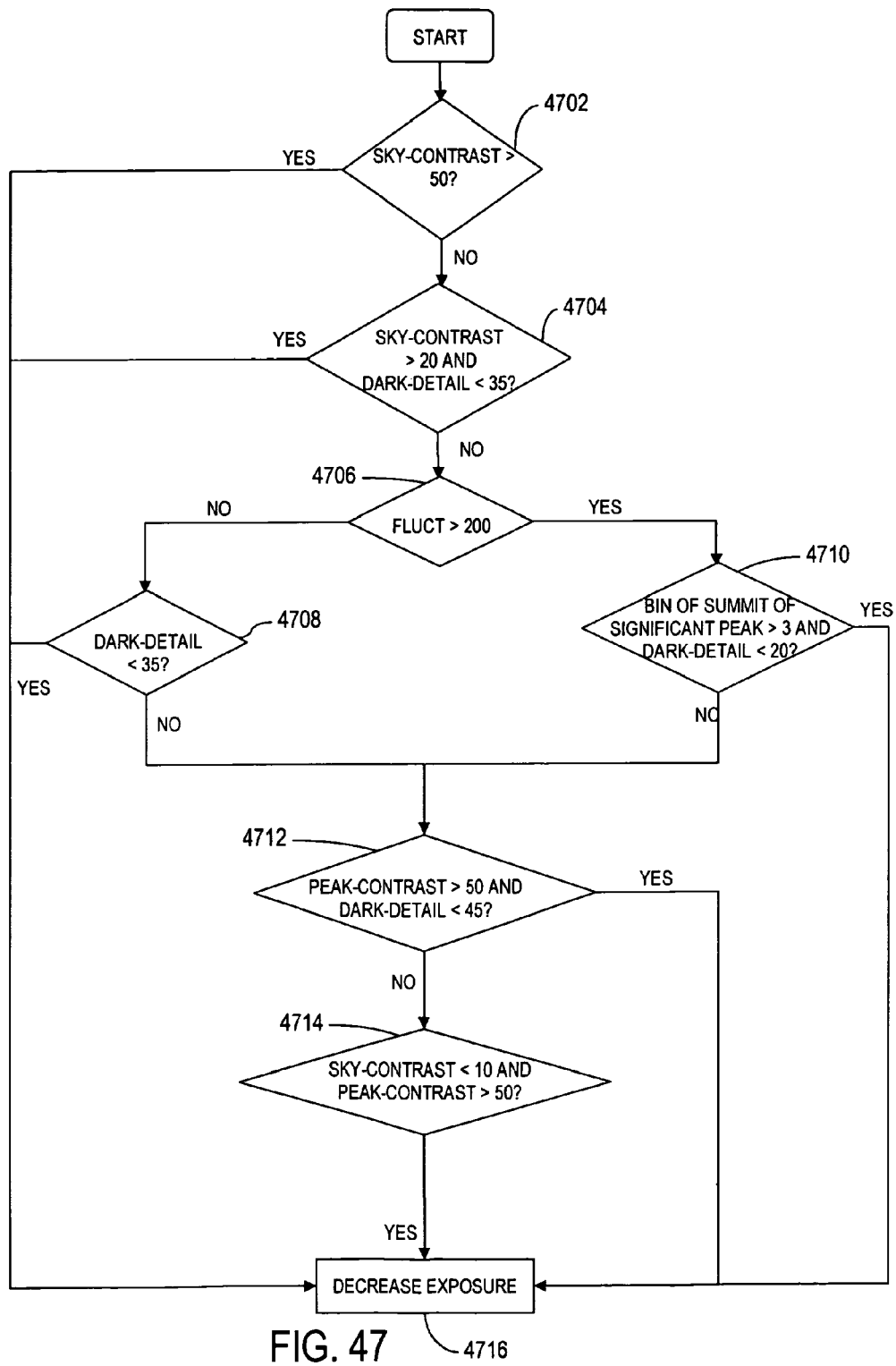
FIG. 47 is a flowchart showing a process to decrease exposure.

FIGS. 46 and 47 show an embodiment on how the criteria can be used to decide between increasing or decreasing exposure. FIG. 46 shows a process to determine whether to increase exposure. Decision block 4602 checks to see if the bin value of the summit of Significant Peak or Right Peak is less than 3. If the test is positive, and if in decision block 4604 it is found that Dark Detail is greater than 55%, exposure may be increased in block 4610. However, if the test from decision block 4602 is negative and in decision block 4606 it is found that Dark Detail is greater than 45%, exposure may also be increased in block 4610. In decision block 4608, the process determines if Dark Detail is greater than 35% and Sky-Contrast is less than 5%. If the test is positive, exposure may be increased as well, otherwise the exposure is not increased.

FIG. 47 shows a process to determine whether to decrease exposure. In decision block 4702 the process determines if Sky Contrast is greater than 50%, while decision block 4704 the process determines if Sky Contrast is greater than 20% and Dark Detail is less than 35%. In decision block 4706 the process determines if fluct is greater than 200. The process determines if Dark Detail is less than 35% in decision block 4708 and in decision block 4710 it is determined whether the bin value of the summit of Significant Peak or Right Peak is greater than 3 and Dark Detail is less than 20%. Decision block 4712 the process determines if the Peak Contrast is greater than 50% and Dark Detail is less than 45% and also decides whether Sky Contrast is less than 10% and Peak Contrast is greater than 50% in decision block 4714.

If either decision block 4702 or 4704 tests positive, exposure is decreased in block 4716. Otherwise, if decision blocks 4706 and 4710 both test positive, or if decision block 4706 tests negative whereas decision block 4708 tests positive, then exposure is decreased as well. If all the above conditions fail, results from decision blocks 4712 and 4714 are used. If either tests positive, exposure is decreased.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for analyzing an image of a scene in a device, the image having a tentative exposure value, comprising:

receiving pixel data for a plurality of pixels of the image into the device;

computing a histogram for the image in the device;

analyzing the histogram to determine whether the tentative exposure value is acceptable; and, rejecting the tentative exposure value and causing a new image of a lesser exposure value to be generated where a population of a maximum in the histogram is less than a threshold that is a multiple of a population of a minimum in the histogram, wherein the minimum has higher intensity value than any other minimum in the histogram and the maximum is a maximum that is nearest to the minimum and that has a lower intensity value than the minimum, wherein the histogram does not include pixels of sky region (s).

2. The method of claim 1, wherein the histogram is generated from the image and the image is generated by an image sensor.

3. The method of claim 1, wherein the histogram is generated from the image and the image is synthesized from a plurality of images of the scene, the plurality of images having different exposure values, the tentative exposure value being intermediate between a maximum exposure value and a minimum exposure value among the different exposure values.

4. The method of claim 1, wherein the histogram is not generated from the image but is synthesized for the tentative exposure value from a plurality of histograms that are generated from a plurality of images of the scene, the plurality of images having different exposure values, the tentative exposure value being intermediate between a maximum exposure value and a minimum exposure value among the different exposure values.

5. The method of claim 1, further comprising:
   determining a ratio of the population of the minimum to the population of the maximum; and,
   comparing the ratio with a threshold.

6. The method of claim 5, wherein the threshold with which the ratio is compared is a predetermined percentage.

* * * * *